United States Patent
Yang et al.

(10) Patent No.: US 12,450,809 B2
(45) Date of Patent: Oct. 21, 2025

(54) METHOD AND APPARATUS FOR PROVIDING INTERACTIVE AVATAR SERVICES

(71) Applicant: SAMSUNG ELECTRONICS CO., LTD., Suwon-si (KR)

(72) Inventors: Jaeeun Yang, Suwon-si (KR); Jaehong Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 287 days.

(21) Appl. No.: 18/098,428

(22) Filed: Jan. 18, 2023

(65) Prior Publication Data

US 2023/0230303 A1    Jul. 20, 2023

Related U.S. Application Data

(63) Continuation of application No. PCT/KR2023/000721, filed on Jan. 16, 2023.

(30) Foreign Application Priority Data

Jan. 18, 2022  (KR) .................. 10-2022-0007400

(51) Int. Cl.
*G06T 13/40* (2011.01)
*G06T 13/20* (2011.01)
(Continued)

(52) U.S. Cl.
CPC ............ *G06T 13/40* (2013.01); *G06T 13/205* (2013.01); *G06T 17/20* (2013.01); *G10L 15/22* (2013.01)

(58) Field of Classification Search
CPC ....... G06T 13/40; G06T 13/205; G06T 17/20; G10L 15/22; G10L 15/04;
(Continued)

(56) References Cited

U.S. PATENT DOCUMENTS 6,753,857 B1 * 6/2004 Matsuura ................ G06T 17/00
                                                   345/419
8,941,642 B2 * 1/2015 Tadaishi .................. G06T 17/00
                                                   345/473
(Continued)

FOREIGN PATENT DOCUMENTS

CN          116762103 A  *  9/2023   ............. G06F 3/165
KR     10-2011-0059178 A     6/2011
(Continued)

OTHER PUBLICATIONS

International Search Report (PCT/ISA/210) issued May 1, 2023 from the International Searching Authority in International Application No. PCT/KR2023/000721.
(Continued)

*Primary Examiner* — Sheree N Brown
(74) *Attorney, Agent, or Firm* — Sughrue Mion, PLLC

(57) ABSTRACT

A method of providing an avatar service includes obtaining a user-uttered voice and a spatial information of a user-utterance space, transmitting the user-uttered voice and the spatial information to a server, receiving, from the server, a first avatar voice answer and an avatar facial expression sequence corresponding to the first avatar voice, which are determined based on the user-uttered voice and the spatial information, determining first avatar facial expression data, based on the first avatar voice answer and the avatar facial expression sequence, identifying a certain event during reproduction of a first avatar animation created based on the first avatar voice answer and the first avatar facial expression data, determining second avatar facial expression data or a second avatar voice answer, based on the certain event, and reproducing a second avatar animation created based on the second avatar facial expression data or the second avatar voice answer.

18 Claims, 19 Drawing Sheets

(51) Int. Cl.
*G06T 17/20* (2006.01)
*G10L 15/22* (2006.01)

(58) Field of Classification Search
CPC ..... G10L 2021/105; G10L 21/10; G06N 3/02;
G06N 3/0442; G06N 3/0464; G06N 3/08;
G06Q 50/40; G06Q 50/50
USPC .......................................................... 345/419
See application file for complete search history.

(56) References Cited

U.S. PATENT DOCUMENTS

| | | | |
|---|---|---|---|
| 9,330,483 B2* | 5/2016 | Du | G06T 17/20 |
| 9,799,133 B2* | 10/2017 | Tong | G06F 3/017 |
| 10,293,260 B1 | 5/2019 | Evans et al. | |
| 10,521,946 B1 | 12/2019 | Roche et al. | |
| 10,586,369 B1* | 3/2020 | Roche | G10L 13/00 |
| 10,726,836 B2 | 7/2020 | Baik et al. | |
| 11,562,520 B2* | 1/2023 | Lee | G06T 13/80 |
| 11,593,984 B2* | 2/2023 | Hussen Abdelaziz | G06N 3/08 |
| 11,651,541 B2* | 5/2023 | Baszucki | G06T 13/205 |
| | | | 345/473 |
| 2005/0253850 A1* | 11/2005 | Kang | H04M 1/72427 |
| | | | 345/473 |
| 2012/0130717 A1 | 5/2012 | Xu et al. | |
| 2012/0310717 A1 | 12/2012 | Kankainen et al. | |
| 2015/0213604 A1* | 7/2015 | Li | G06T 13/80 |
| | | | 345/473 |
| 2016/0005206 A1* | 1/2016 | Li | G06T 13/40 |
| | | | 345/474 |
| 2017/0206694 A1* | 7/2017 | Jiao | G06V 40/174 |
| 2017/0206797 A1* | 7/2017 | Solomon | G06N 3/006 |
| 2017/0256086 A1* | 9/2017 | Park | G06T 13/40 |
| 2018/0253897 A1* | 9/2018 | Satake | A63F 13/215 |
| 2018/0316734 A1* | 11/2018 | Nakabo | H04L 65/4053 |
| 2018/0335930 A1* | 11/2018 | Scapel | H04L 51/10 |
| 2018/0336713 A1* | 11/2018 | Avendano | G06T 13/40 |
| 2018/0373413 A1* | 12/2018 | Sawaki | H04N 13/332 |
| 2019/0138266 A1 | 5/2019 | Takechi et al. | |
| 2019/0143527 A1 | 5/2019 | Favis et al. | |
| 2019/0250934 A1* | 8/2019 | Kim | H04M 1/72436 |
| 2019/0340419 A1* | 11/2019 | Milman | G06N 20/00 |
| 2020/0410739 A1 | 12/2020 | Shin et al. | |
| 2021/0027511 A1* | 1/2021 | Shang | G06N 3/044 |
| 2021/0056747 A1* | 2/2021 | Hefny | G06T 17/20 |
| 2022/0241692 A1* | 8/2022 | Fukushige | A63F 13/54 |
| 2022/0301250 A1* | 9/2022 | Ko | G06V 40/174 |

FOREIGN PATENT DOCUMENTS

| | | |
|---|---|---|
| KR | 10-2011-0081364 A | 7/2011 |
| KR | 10-1089184 A | 12/2011 |
| KR | 10-2018-0084582 A | 7/2018 |
| KR | 10-2019-0046371 A | 5/2019 |
| KR | 10-1992424 B1 | 6/2019 |
| KR | 10-2108422 B | 5/2020 |
| KR | 10-2021-0060196 A | 5/2021 |
| WO | 2020/159621 A1 | 8/2020 |

OTHER PUBLICATIONS

"DeepSpeech Model", Mozilla DeepSpeech, https://deepspeech.readthedocs.io/en/master/DeepSpeech.html, 2020, (3 pages total).

D. Cudeiro et al., "VOCA Coice Operated Character Animation", Computer Vision and Pattern Recognition (CVPR), http://voca.is.tue.mpg.de/, 2019, (4 pages total).

Communication dated Feb. 7, 2025, issued by European Patent Office in European Patent Application No. 23743425.3.

* cited by examiner

FIG. 4

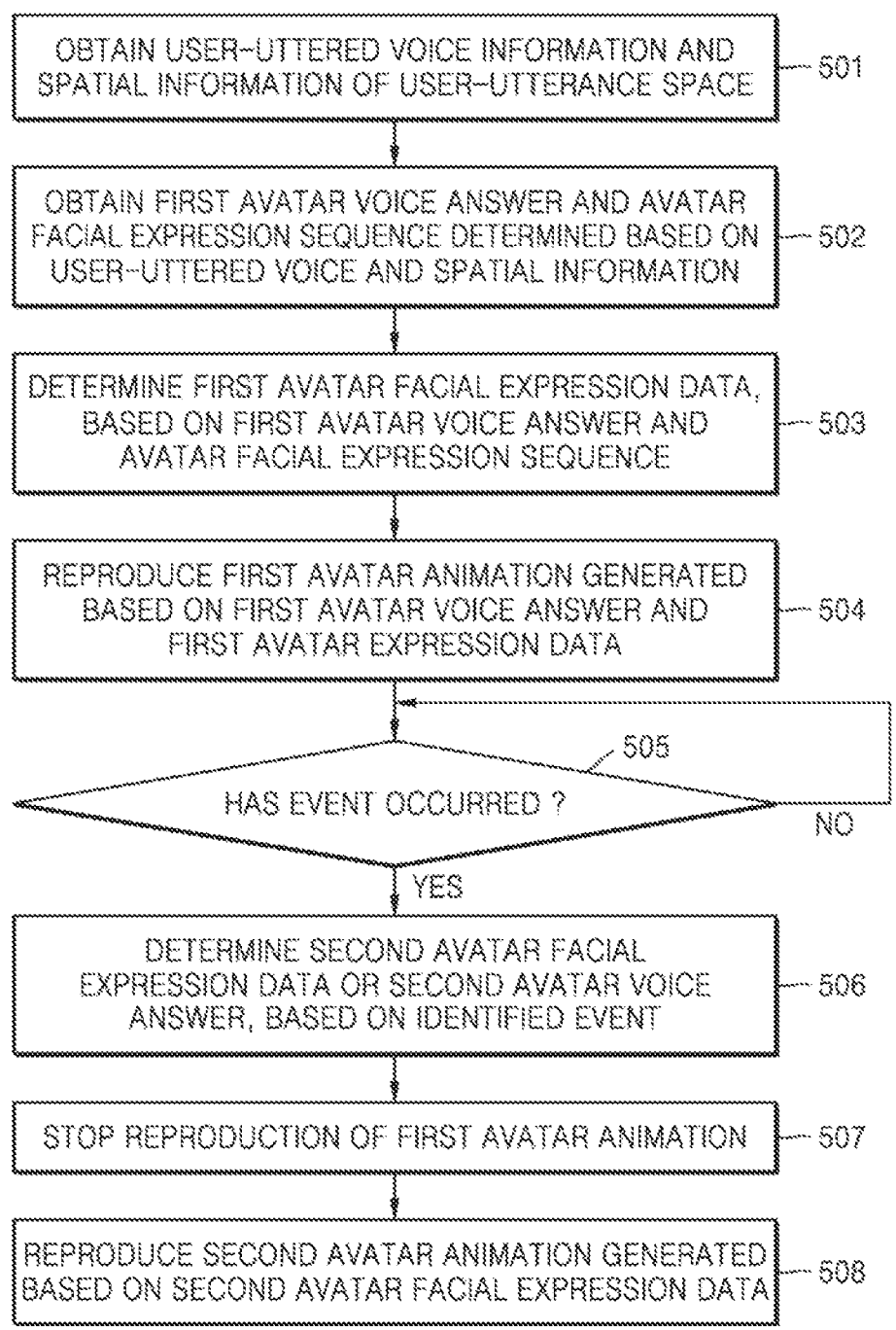

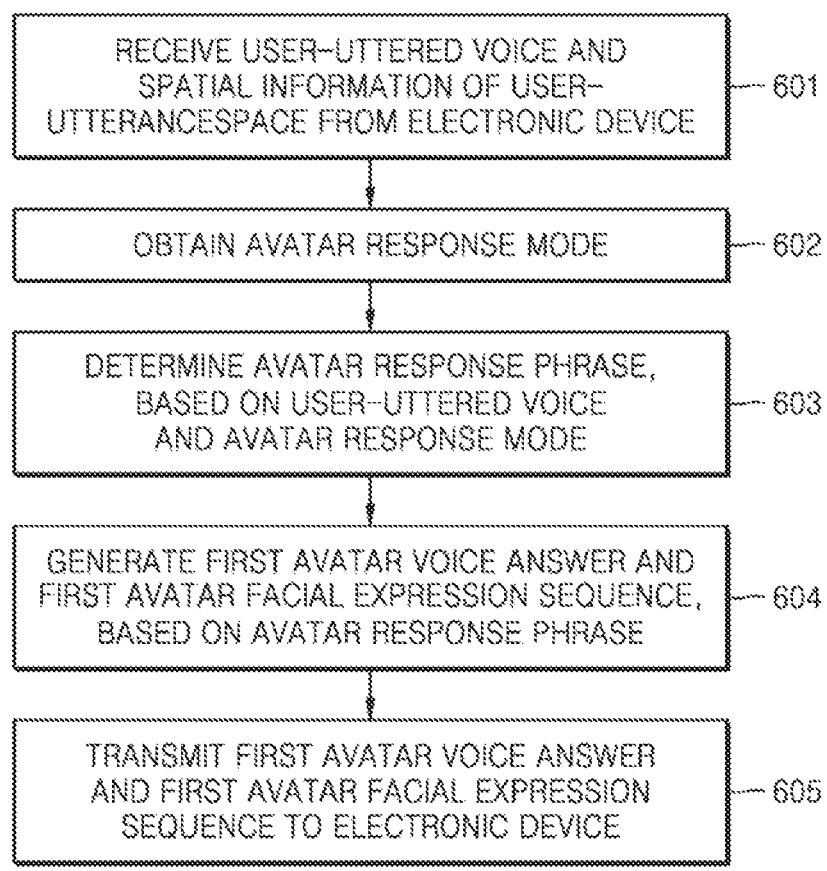

METHOD AND APPARATUS FOR PROVIDING INTERACTIVE AVATAR SERVICES

CROSS-REFERENCE TO RELATED APPLICATIONS

This application is a bypass continuation of PCT International Application No. PCT/KR2023/000721, which was filed on Jan. 16, 2023, and claims priority to Korean Patent Application No. 10-2022-0007400, filed on Jan. 18, 2022, in the Korean Intellectual Property Office, the disclosures of which are incorporated herein by reference in their entireties.

BACKGROUND

1. Field

The disclosure relates to a method of providing an interactive avatar service in an electronic device.

2. Description of Related Art

As natural language processing technology develops along with the development of artificial intelligence (AI) technology, interactive avatars or AI chatbots are becoming widely used. Interactive avatars or AI chatbots are improving user experience by providing immediate and direct feedback to users' questions, and their application areas are expanding.

Interactive avatars can be considered as a type of chatbot, and because the conversation itself is important, users generally tend to recognize an avatar as a human. The more human-like the avatar is, the more users can feel emotional intimacy and social connection, and thus feel interactions with the avatar positively. Such a positive feeling may lead to a liking for the avatar and may be a factor for using the avatar more frequently and continuously.

SUMMARY

An affinity for avatars may be improved when human qualities are added in terms of visual, conversational, and behavioral aspects. In the visual aspect, it is desirable to set an avatar character as a person to express various emotions, and in the conversational aspect, it is desirable to apply a pattern of conversation as if having a conversation with a real person. In the behavioral aspect, it is necessary to give proactivity that responds in advance by grasping the other person's situation and intention. In this case, the avatar may play a role not only as an intelligent assistant but also as an emotional assistant by appropriately changing the avatar's voice or facial expression, based on the recognized situation, rather than just recognizing the other party's situation.

According to an embodiment of the disclosure, a method, performed by an electronic device, of providing an avatar service may include obtaining a user-uttered voice and spatial information of a user-utterance space. According to an embodiment of the disclosure, a method, performed by an electronic device, of providing an avatar service may include transmitting the obtained user-uttered voice and the obtained spatial information to a server. According to an embodiment of the disclosure, a method, performed by an electronic device, of providing an avatar service may include receiving, from the server, a first avatar voice answer and an avatar facial expression sequence corresponding to the first avatar voice answer, which are determined based on the user-uttered voice and the spatial information. According to an embodiment of the disclosure, a method, performed by an electronic device, of providing an avatar service may include determining first avatar facial expression data, based on the first avatar voice answer and the avatar facial expression sequence. According to an embodiment of the disclosure, a method, performed by an electronic device, of providing an avatar service may include identifying a certain event during reproduction of a first avatar animation created based on the first avatar voice answer and the first avatar facial expression data. According to an embodiment of the disclosure, a method, performed by an electronic device, of providing an avatar service may include determining second avatar facial expression data or a second avatar voice answer, based on the identified certain event. According to an embodiment of the disclosure, a method, performed by an electronic device, of providing an avatar service may include reproducing a second avatar animation created based on the second avatar facial expression data or the second avatar voice answer.

According to an embodiment of the disclosure, a method, performed by a server, of providing an avatar service through an electronic device may include receiving a user-uttered voice and spatial information of a user-utterance space from the electronic device. According to an embodiment of the disclosure, a method, performed by a server, of providing an avatar service through an electronic device may include determining an avatar response mode for the user-uttered voice, based on the spatial information. According to an embodiment of the disclosure, a method, performed by a server, of providing an avatar service through an electronic device may include generating a first avatar voice answer for an avatar to respond to the user-uttered voice and an avatar facial expression sequence corresponding to the first avatar voice answer, based on the user-uttered voice and the response mode. According to an embodiment of the disclosure, a method, performed by a server, of providing an avatar service through an electronic device may include transmitting the first avatar voice answer and the avatar facial expression sequence for generating a first avatar animation to the electronic device.

According to an embodiment of the disclosure, an electronic device for providing an avatar service may include a communication interface, a storage storing a program including at least one instruction, and at least one processor configured to execute the at least one instruction stored in the storage. The at least one processor is configured to execute the at least one instruction to obtain a user-uttered voice and spatial information of a user-utterance space. The at least one processor is configured to execute the at least one instruction to transmit the obtained user-uttered voice and the spatial information to a server. The at least one processor is configured to execute the at least one instruction to receive, from the server, a first avatar voice answer and an avatar facial expression sequence corresponding to the first avatar voice answer, which are determined based on the user-uttered voice and the spatial information, through the communication interface. The at least one processor is configured to execute the at least one instruction to determine first avatar facial expression data, based on the first avatar voice answer and the avatar facial expression sequence, identify a certain event during reproduction of a first avatar animation created based on the first avatar voice answer and the first avatar facial expression data. The at least one processor is configured to execute the at least one instruction to determine second avatar facial expression data or a second avatar voice answer, based on the identified certain event. The at least one processor is configured to execute the at least one instruction to reproduce a second avatar animation created based on the second avatar facial expression data or the second avatar voice answer.

According to an embodiment of the disclosure, a server for providing an avatar service through an electronic device includes a communication interface, a storage storing a program including at least one instruction, and at least one processor configured to execute the at least one instruction stored in the storage. The at least one processor is configured to execute the at least one instruction to receive a user-uttered voice and spatial information of a user-utterance space from the electronic device through the communication interface. The at least one processor is configured to execute the at least one instruction to determine an avatar response mode for the user-uttered voice, based on the spatial information. The at least one processor is configured to execute the at least one instruction to generate a first avatar voice answer for an avatar to respond to the user-uttered voice and an avatar facial expression sequence corresponding to the first avatar voice answer, based on the user-uttered voice and the response mode. The at least one processor is configured to execute the at least one instruction to transmit the first avatar voice answer and the avatar facial expression sequence for generating a first avatar animation to the electronic device through the communication interface.

According to an embodiment of the disclosure, a non-transitory computer-readable recording medium has recorded thereon a computer program for performing the above-described method.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a diagram for explaining a change in an avatar response according to time and circumstances, in an interactive avatar providing system according to an embodiment;

FIG. 5 is a flowchart of an avatar providing method performed by an electronic device, according to an embodiment;

FIG. 6 is a flowchart of an avatar providing method performed by a server, according to an embodiment;

DETAILED DESCRIPTION

Figure 1:
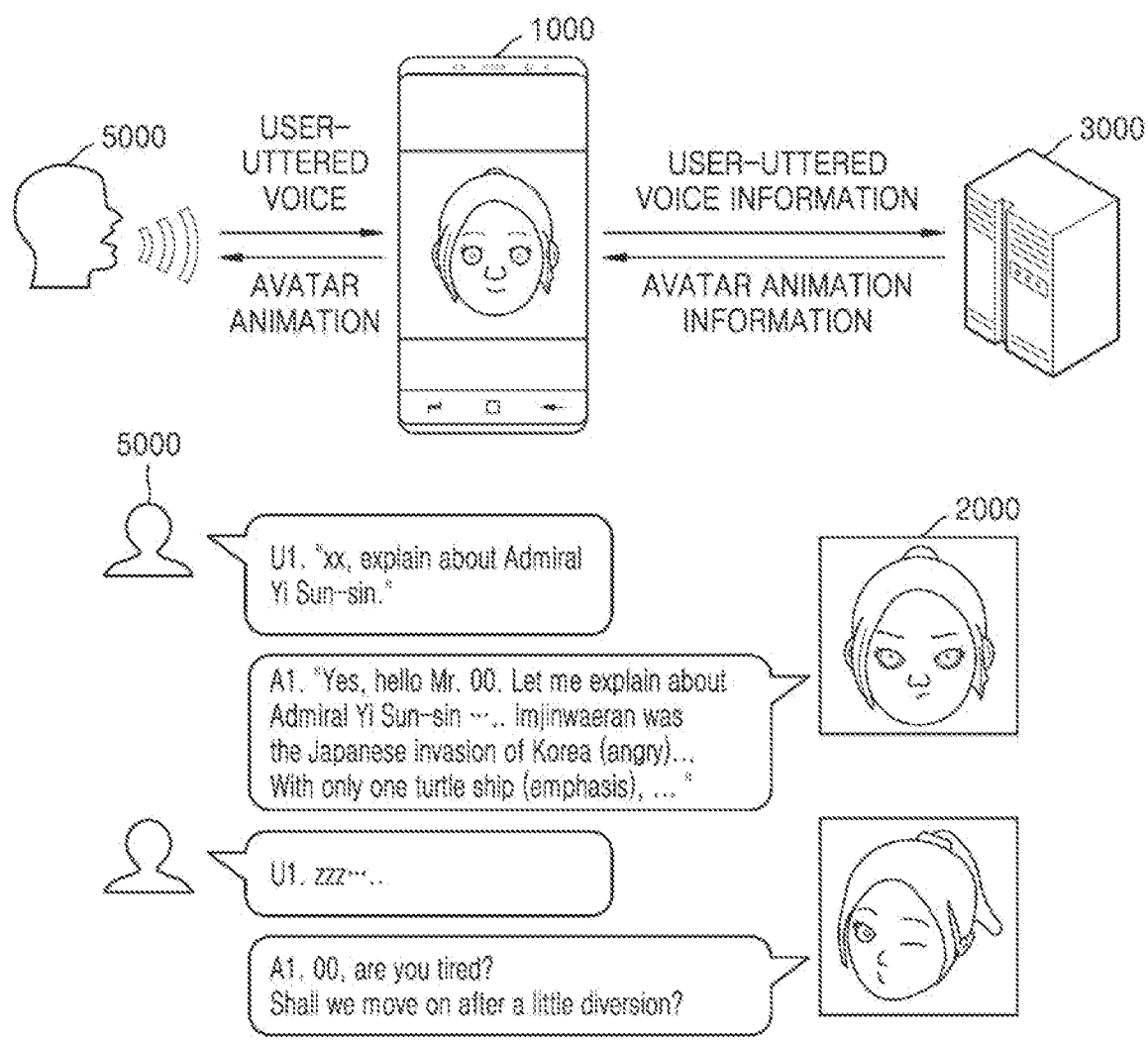
FIG. 1 is a view illustrating an interactive avatar providing system according to an embodiment.

In the disclosure, expressions such as "A, B, or C," "at least one of A, B, and/or C," or "one or more of A, B, and/or C" may include all possible combinations of the items listed together. For example, "A, B, or C," "at least one of A, B, and C," or "at least one of A, B, or C" may refer to all cases including (1) at least one A, (2) at least one B, (3) at least one C, (4) at least one A and at least one B, (5) at least one A and at least one C, (6) at least one B and at least one C, or (7) at least one A, at least one B, and at least one C, or variations thereof.

Embodiments of the disclosure will now be described more fully with reference to the accompanying drawings such that one of ordinary skill in the art to which the disclosure pertains may easily execute the disclosure. In the following description of embodiments of the disclosure, descriptions of techniques that are well known in the art and not directly related to the disclosure are omitted. This is to clearly convey the gist of the disclosure by omitting any unnecessary explanation. For the same reason, some elements in the drawings are exaggerated, omitted, or schematically illustrated. Also, actual sizes of respective elements are not necessarily represented in the drawings.

The disclosure may, however, be embodied in many different forms and should not be construed as being limited to the embodiments set forth herein. In the drawings, parts irrelevant to the description are omitted for simplicity of explanation, and like numbers refer to like elements throughout.

Throughout the specification, when an element is referred to as being "connected" or "coupled" to another element, it can be directly connected or coupled to the other element, or can be electrically connected or coupled to the other element with intervening elements interposed therebetween. In addition, the terms "comprises" and/or "comprising" or "includes" and/or "including" when used in this specification, specify the presence of stated elements, but do not preclude the presence or addition of one or more other elements.

The advantages and features of the disclosure and methods of achieving the advantages and features will become apparent with reference to embodiments of the disclosure described in detail below with reference to the accompanying drawings. The disclosure may, however, be embodied in many different forms and should not be construed as being limited to the embodiments set forth herein; rather, these embodiments are provided so that this disclosure will be thorough and complete, and will fully convey the concept of the disclosure to one of ordinary skill in the art. The scope of the disclosure is only defined by the appended claims and their equivalents.

It will be understood that each block of flowchart illustrations and combinations of blocks in the flowchart illustrations may be implemented by computer program instructions. These computer program instructions may be provided to a processor of a general-purpose computer, special purpose computer, or other programmable data processing equipment, such that the instructions, which are executed via the processor of the computer or other programmable data processing equipment, generate means for performing functions specified in the flowchart block(s). These computer program instructions may also be stored in a computer-usable or computer-readable memory that may direct a computer or other programmable data processing equipment to function in a particular manner, such that the instructions stored in the computer-usable or computer-readable memory produce a manufactured article including instruction means that perform the functions specified in the flowchart block(s). The computer program instructions may also be loaded onto a computer or other programmable data processing equipment to cause a series of operational steps to be performed on the computer or other programmable data processing equipment to produce a computer-executable process such that the instructions that are executed on the computer or other programmable data processing equipment provide steps for implementing the functions specified in the flowchart block or blocks.

In addition, each block may represent a module, segment, or portion of code, which includes one or more executable instructions for implementing specified logical function(s). It should also be noted that in some alternative implementations, the functions noted in the blocks may occur out of the presented order. For example, two blocks shown in succession may in fact be executed substantially concurrently or the blocks may sometimes be executed in the reverse order, according to the functionality involved.

The term 'unit' or 'processor' used in the embodiments indicates a software component or a hardware component such as a Field Programmable Gate Array (FPGA) or an Application-Specific Integrated Circuit (ASIC), and the term 'unit' or 'processor' performs certain roles. However, the term 'unit' or 'processor' is not limited to software or hardware. The term 'unit' or 'processor' may be configured to be included in an addressable storage medium or to reproduce one or more processors. Thus, the term 'unit' or 'processor' may include, by way of example, object-oriented software components, class components, and task components, and processes, functions, attributes, procedures, subroutines, segments of a program code, drivers, firmware, a micro code, a circuit, data, a database, data structures, tables, arrays, and variables. Functions provided by components and 'units' or 'processors' may be combined into a smaller number of components and 'units' or 'processors' or may be further separated into additional components and 'units' or 'processors'. In addition, the components and 'units' or 'processors' may be implemented to operate one or more central processing units (CPUs) in a device or a secure multimedia card. According to an embodiment of the disclosure, the 'unit' or 'processor' may include one or more processors.

Functions related to artificial intelligence (AI) according to the disclosure are operated through a processor and a memory. The processor may include one or a plurality of processors. The one or plurality of processors may be a general-purpose processor such as a central processing unit (CPU), an application processor (AP), or a digital signal processor (DSP), a graphics-only processor such as a graphics processing unit (GPU) or a vision processing unit (VPU), or an AI-only processor such as a neural processing unit (NPU). The one or plurality of processors control to process input data, according to a predefined operation rule or AI model stored in the memory. Alternatively, when the one or plurality of processors are AI-only processors, the AI-only processors may be designed in a hardware structure specialized for processing a specific AI model.

The predefined operation rule or AI model is characterized in that it is created through learning. Here, being created through learning may indicate that a basic AI model is learned using a plurality of learning data by a learning algorithm, so that a predefined operation rule or AI model set to perform desired characteristics (or a purpose) is created. Such learning may be performed in a device itself on which AI according to the disclosure is performed, or may be performed through a separate server and/or system. Examples of the learning algorithm include, but are not limited to, supervised learning, unsupervised learning, semi-supervised learning, or reinforcement learning.

The AI model may include a plurality of neural network layers. Each of the plurality of neural network layers may have a plurality of weight values, and performs a neural network operation through an operation between an operation result of a previous layer and the plurality of weight values. The plurality of weight values of the plurality of neural network layers may be optimized by a learning result of the AI model. For example, the plurality of weight values may be updated so that a loss value or a cost value obtained from the AI model is reduced or minimized during a learning process. An artificial neural network may include a deep neural network (DNN), for example, a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), or a Deep Q-Networks, but embodiments of the disclosure are not limited thereto.

In the disclosure, a 'server' is a computer system that provides information or services to a user equipment (UE) or a client through a network, and may represent a server program or a device. The server monitors or controls the entire network, such as file management, or connects the network with other networks through a main frame or a public network. The server enables sharing of software resources such as data, programs, and files, or hardware resources such as modems, fax machines, and routers. The server may provide a service according to a user's (client's) request. In the server, one or more application programs may be operated in a form of distributed processing in a mutually cooperative environment.

An avatar used herein refers to a virtual ego graphic used as a person's alter ego. An avatar service may be a service that provides an interaction using an interactive avatar that provides a conversation with a user. The interactive avatar may provide the user with a response message, like a person directly talking with a user, by taking into account the user's circumstances, an electronic device's circumstances, and the like.

A user-uttered voice refers to a voice uttered by a user of an electronic device used to provide an avatar service in order to interact with an avatar. The user-uttered voice may include not only analog voice data uttered by the user but also digital data into which an analog voice uttered by the user is converted to be processed by the electronic device and the server.

Spatial information of a space where a user makes a sound may refer to information about characteristics of the space where the user makes a sound or a space where an electronic device is used. The spatial information of the space where a user makes a sound may include information about whether a place where the user makes a sound is a public place or a private space, or whether the space where the user makes a sound is quiet or noisy.

The electronic device is a device that provides an avatar service to a user, and may include not only a mobile device such as a mobile phone, a tablet PC, and an augmented reality device, but also a display device. An electronic device according to an embodiment of the disclosure may transmit a user-uttered voice obtained using a microphone or the like and spatial information obtained using a camera or the like to a server, receive avatar voice information and an avatar facial expression sequence from the server, and generate an avatar animation, based on avatar facial expression data and avatar lip sync data and provide the generated avatar animation to the user.

The server may determine the avatar voice information and the avatar facial expression sequence, based on user-uttered voice information and the spatial information received from the electronic device, and transmit the determined avatar voice information and the determined avatar facial expression sequence to the electronic device.

The avatar voice information refers to information about a voice uttered by an avatar in response to the user-uttered voice. The user-uttered voice may be speech-to-text (STT) converted using speech recognition technology, and the context and meaning of the user-uttered voice may be ascertained, and, once the context and meaning are ascertained, the avatar's response method (or an utterance mode) may be determined. The avatar's response phrase may be determined based on not only the context and meaning of the user-uttered voice but also the avatar's response method. The avatar voice information may include information about a voice uttered by the avatar, which is generated by text-to-speech (TTS) conversion of the determined avatar's response phrase.

The avatar facial expression sequence refers to a change in the avatar's facial expression over time, which corresponds to the avatar voice information. The avatar's facial expression may be determined based on the avatar's response phrase and the avatar's response method, and may change over time in response to the avatar's response phrase.

The avatar facial expression data refers to information for rendering the avatar's facial expression. The avatar facial expression data is information about a reference 3D mesh model for rendering the avatar's facial expression, and may include a group or set of coefficients for each of a plurality of reference 3D meshes in each frame. For example, the avatar facial expression data may be blend shapes, a morph target, or facial action coding system (FACS) information.

The avatar lip sync data refers to information about the mouth (or lips) and chin among the avatar facial expression data. Even when the avatar utters the same voice, the mouth shape may be expressed differently according to the emotion and facial expression at the time of utterance, so the information on the mouth (or lips) and chin used to express the mouth shape is defined as the avatar lip sync data. For example, the avatar lip sync data may be information about the mouth (or lips) and chin among the blend shapes, the morph target, or the FACS information.

The avatar animation refers to a movement (change) of an avatar over time, and is output in synchronization with the avatar uttered voice.

An event refers to occurrence of a situation in which a currently-being-reproduced avatar animation needs to be changed, while the avatar animation is being played. For example, when a change in the user's location is identified during reproduction of the avatar animation, the electronic device may rotate the avatar's face (or head) according to the user's location or change the avatar's gaze along the user's face. Alternatively, when it is identified that the user's concentration level is lowered during reproduction of the avatar animation, the electronic device may stop the reproduced avatar animation, play an animation capable of arousing the user's attention, and then play the existing avatar animation continuously. Alternatively, when an input to lower the speaker output of the electronic device (for example, a volume down button input) is detected while the avatar animation is being played, the electronic device may determine the utterance mode of the avatar as a 'whisper' mode, and may change the avatar's facial expression according to the determined utterance mode.

FIG. 1 is a view illustrating an interactive avatar providing system according to an embodiment of the disclosure.

Referring to FIG. 1, the interactive avatar providing system may include an electronic device 1000 and a server 3000.

When a user 5000 of the electronic device 1000 utters a certain voice for interaction with an avatar 2000, the electronic device 1000 may obtain and analyze the voice uttered by the user 5000, and may transmit, to the server 3000, user-uttered voice information including digital data converted to be able to be processed by the user 5000.

In response to the user uttered voice information received from the electronic device 1000, the server 3000 may determine an avatar voice answer and an avatar facial expression sequence, based on the user uttered voice information received from the electronic device 1000, and may transmit the determined avatar voice answer and the determined avatar facial expression sequence to the electronic device 1000.

In response to the avatar voice answer and the avatar facial expression sequence received from the server 3000, the electronic device 1000 may generates an avatar animation based on the received avatar voice answer and the avatar expression sequence and provide the avatar animation to the user 5000, so that the user 5000 may interact with the avatar 2000.

For example, when the user 5000 utters a voice saying "xx, explain about Admiral Yi Sun-sin", the electronic device 1000 obtains a user-uttered voice and transmits information about the obtained user-uttered voice to the server 3000. In this case, xx may be the name of an avatar set by the electronic device 1000 or the user 5000.

The server 3000 may determine the avatar voice answer and the avatar expression sequence, based on information about the user-uttered voice "xx, explain about Admiral Yi Sun-sin" received from the electronic device 1000. At this time, the avatar voice answer may be determined as "Yes, hello Mr. 00. Let me explain about Admiral Yi Sun-sin . . . Imjinwaeran was the Japanese invasion of Korea . . . With only one turtle ship, . . . ". The avatar facial expression sequence may be determined as {(normal), (angry), (emphasis), . . . }, and 00 may be the name of user 5000 or a user name set by user 5000. The server 3000 may transmit the determined avatar voice answer and the determined avatar facial expression sequence to the electronic device 1000.

The electronic device 1000 may generate avatar facial expression data, based on the avatar voice answer and the avatar facial expression sequence received from the server 3000, and may generate an avatar animation based on the generated avatar facial expression data and the avatar voice answer. For example, when a blendshape is used to render the avatar's facial expression, the server 3000 may determine, as the avatar facial expression data, a blendshape for rendering an avatar facial expression in a state {(normal), (angry), (emphasis), . . . }.

According to an embodiment of the disclosure, the electronic device 1000 may continuously monitor the state of the user 5000 during reproduction of the avatar animation, and, when it is identified that a certain event has occurred as a result of the monitoring, the electronic device 1000 may change the currently-being-reproduced avatar animation, based on the identified event.

According to an embodiment of the disclosure, the electronic device 1000 may continuously monitor the state of the user 5000 during reproduction of the avatar animation, and, when it is identified that a certain event has occurred as a result of the monitoring, the electronic device 1000 may transmit an event identification result and event information to the server 3000. In response to the event identification result and the event information, the server 3000 may transmit avatar voice information and the avatar facial expression data to be changed based on the event information to the electronic device 1000, and the electronic device 1000 may change the currently-being-reproduced avatar animation, based on the avatar voice information and the avatar facial expression data received from the server 3000.

Referring to FIG. 1, when the electronic device 1000 determines, as a result of monitoring the state of the user 5000, that the user is dozing off, the electronic device 1000 may stop the currently-being-reproduced avatar animation and determine an avatar animation that is to be output as a replacement, in order to call the user's attention. At this time, a voice answer of an avatar output as a replacement may be determined as "00, are you tired? Shall I continue talking after changing your mood for a while?", and, based on the determined avatar voice answer, a facial expression sequence and facial expression data suitable for the determined avatar voice answer may be determined. The electronic device 1000 may reproduce the stopped avatar animation again when playback of the avatar animation output as a replacement is ended.

Figure 2:
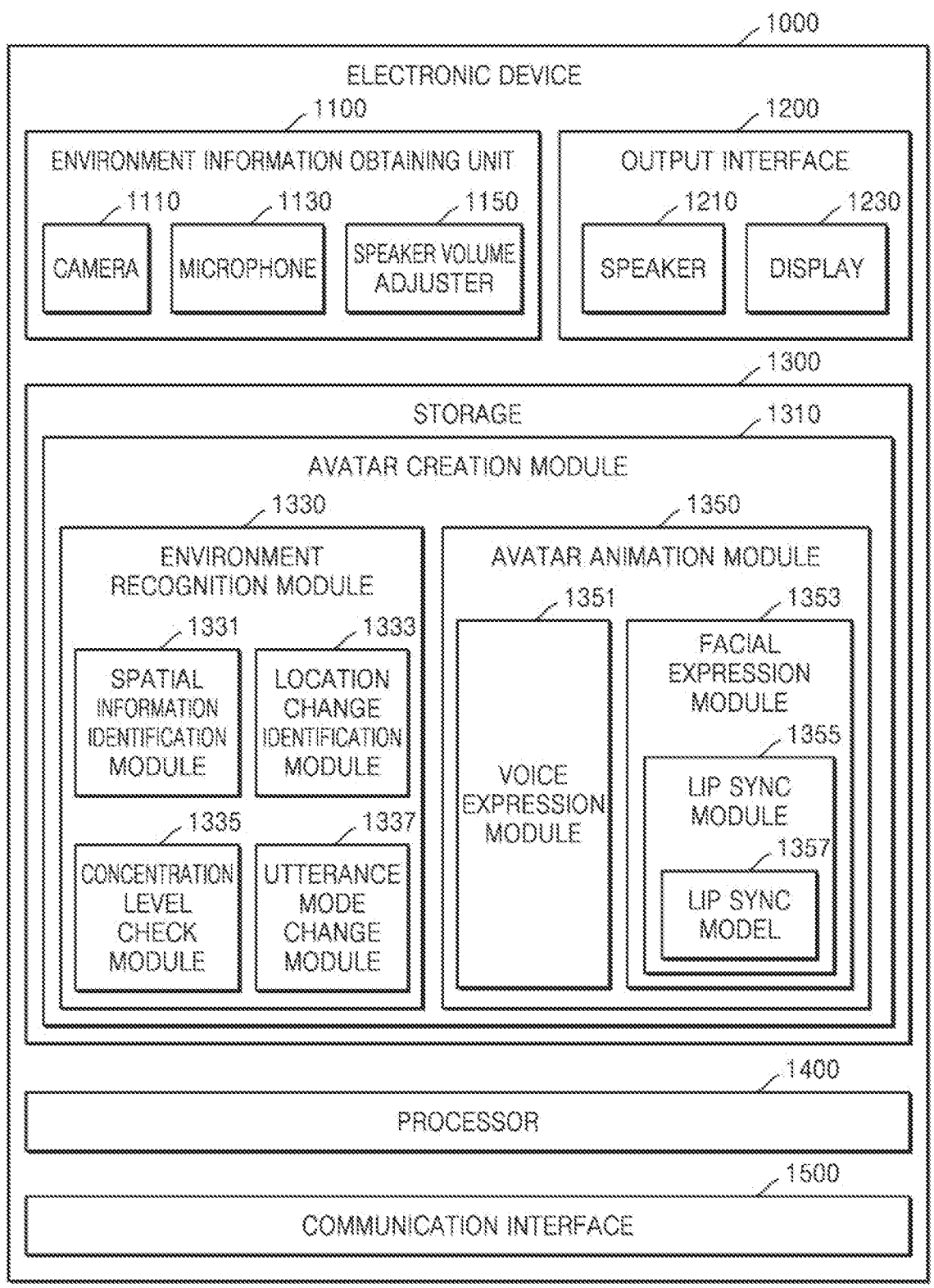
FIG. 2 is a block diagram of an electronic device according to an embodiment.

FIG. 2 is a block diagram of the electronic device 1000 according to an embodiment of the disclosure.

Referring to FIG. 2, the electronic device 1000 may include an environment information obtaining unit 1100, an output interface 1200, a storage 1300, a processor 1400, and a communication interface 1500.

According to an embodiment of the disclosure, the processor 1400 may be referred to as at least one processor, and thus may be understood as a component that controls operations with respect to other components of the electronic device 1000. According to an embodiment of the disclosure, the configuration of the electronic device 1000 is not limited to that shown in FIG. 2, and may additionally include components not shown in FIG. 2 or may omit some of the components shown in FIG. 2. For example, the electronic device 1000 may further include a separate processor, e.g., a neural processing unit (NPU), for an artificial intelligence model, e.g., at least one learning model 1357. At least a part of a facial expression module 1353 included in the storage 1300 may be implemented as a separate hardware module instead of a software module stored in the storage 1300.

The environment information obtaining unit 1100 may refer to a means through which the electronic device 1000 may obtain environment information necessary for providing an avatar service to a user.

A camera 1110 may be understood as a component that is the same as or similar to a camera or camera module for obtaining an image. According to an embodiment of the disclosure, the camera 1110 may include a lens, a proximity sensor, and an image sensor. According to various embodiments of the disclosure, one or more cameras 1110 may be provided according to functions or purposes. For example, the camera 1110 may include a first camera sensor including a wide-angle lens and a second camera including a telephoto lens.

According to an embodiment of the disclosure, the camera 1110 may capture images of the user and a surrounding environment when the user speaks, and may transmit captured image information to a spatial information identification module 1331. The camera 1110 may capture a user image when an avatar speaks (when an avatar animation is played back), and may transmit captured image information to a location change identification module 1333 and a concentration level check module 1335.

In an interactive avatar providing method according to the disclosure, the electronic device 1000 may obtain spatial information of a space where the user utters a word, based on the images of the user and the surrounding environment captured by the camera 1110 when the user speaks. For example, the electronic device 1000 may determine whether the space is a public place or a private place, by identifying the space itself, based on the images captured through the camera 1110. Alternatively, the electronic device 1000 may determine whether the space is a public place or a private place, by identifying whether other people exist around the user, based on the images of the user and the surrounding environment captured by the camera 1110.

According to an embodiment of the disclosure, the electronic device 1000 may identify whether a certain event to change the avatar animation currently being played back has occurred, based on the user image captured by the camera 1110 while the avatar animation is being played back.

For example, the electronic device 1000 may identify whether the user's location has changed, based on the user image captured by the camera 1110 while the avatar animation is being played back, and, when the user's location has changed, may change the avatar animation so that the avatar's face (or head) direction or the avatar's eyes follows the user's location.

Alternatively, the electronic device 1000 may identify whether the user's concentration level has been lowered, based on the image captured by the camera 1110 while the avatar animation is being played back, and may change the avatar animation to call the user's attention.

A microphone 1130 refers to a sensor for obtaining a user-uttered voice and spatial information upon user utterance.

In an interactive avatar providing method according to an embodiment of the disclosure, the electronic device 1000 may obtain a user-uttered voice, which is an analog signal, by using the microphone 1130, during user utterance, and may transmit obtained user-uttered voice information to the server 3000, so that the server 3000 may perform voice recognition and voice synthesis, based on the received user-uttered voice information.

In the interactive avatar providing method according to an embodiment of the disclosure, the electronic device 1000 may obtain the user-uttered voice, which is an analog signal, by using the microphone 1130, during user utterance, and may convert the obtained user-uttered voice into computer-readable text by using an automatic speech recognition (ASR) model. By interpreting the converted text by using a Natural Language Understanding (NLU) model, the electronic device 1000 may obtain the user's utterance intention. The electronic device 1000 may transmit a result of the voice recognition of the user-uttered voice by using ASR and NLU to the server 3000 so that the server 3000 synthesizes the avatar's voice answer, based on the received result of the voice recognition.

The ASR model or the NLU model may be an AI model. The AI model may be processed by an AI-only processor designed with a hardware structure specialized for processing the AI model. The AI model may be created through learning. Here, being created through learning means that a basic AI model is trained using a plurality of learning data by a learning algorithm, so that a predefined operation rule or AI model set to perform desired characteristics (or a desired purpose) is created. The AI model may be composed of a plurality of neural network layers. Each of the plurality of neural network layers has a plurality of weight values, and performs a neural network operation through an operation between an operation result of a previous layer and the plurality of weight values. Linguistic understanding is a technology that recognizes and applies/processes human language/character, and thus includes natural language processing, machine translation, a dialog system, question answering, and speech recognition/speech recognition/synthesis, etc.

In the interactive avatar providing method according to an embodiment of the disclosure, the electronic device 1000 may obtain a noise level of a user-utterance space and spatial characteristics of the user-utterance space, based on a sound obtained through the microphone 1130 during user utterance.

A speaker volume adjuster 1150 refers to a component that receives a user input for adjusting the volume of a speaker 1210.

In the interactive avatar providing method according to an embodiment of the disclosure, while the avatar animation is being played back, the electronic device 1000 may identify whether a certain event to change the animation currently being played back has occurred, based on an input of the speaker volume adjuster 1150.

For example, when the user requests to lower a speaker volume while the avatar animation is being played back, namely, when the speaker volume adjuster 1150 obtains a speaker volume down input, the electronic device 1000 determines that the user wants to listen to a response of the avatar with a lower volume, and thus the electronic device 1000 may change the utterance mode of the avatar to 'whisper' and may change the avatar animation accordingly.

The output interface 1200 is provided to output an audio signal or a video signal. The output interface 1200 may include a speaker 1210 and a display 1230.

According to an embodiment of the disclosure, the speaker 1210 may output a voice uttered by the avatar. The speaker 1210 may include a single speaker or a plurality of speakers, and the speaker 1210 may include a full-range speaker, a woofer speaker, etc., but embodiments of the disclosure are not limited thereto.

According to an embodiment of the disclosure, the display 1230 may display and output information that is processed by the electronic device 1000. For example, the display 1230 may display a GUI for providing an avatar service, a preview image of a space photographed by a camera, or an avatar animation.

The storage 1300 may store programs to perform processing and controlling by the processor 1400. The storage 1300 may include at least one type of storage medium from among a flash memory type storage medium, a hard disk type storage medium, a multimedia card micro type storage medium, a card type memory (for example, SD or XD memory), a random access memory (RAM), a static RAM (SRAM), a read-only memory (ROM), an electrically erasable programmable ROM (EEPROM), a programmable ROM (PROM), a magnetic memory, a magnetic disk, and an optical disk.

The programs stored in the storage 1300 may be classified into a plurality of modules according to their functions. For example, the storage 1300 may include an avatar creation module 1310, and the avatar creation module 1310 may include an environment recognition module 1330 and an avatar animation module 1350.

The environment recognition module 1330 may recognize a user-uttered environment or the user's electronic device use environment, based on the environment information obtained through the environment information obtaining unit 1100. The environment recognition module 1330 may identify whether the certain event to change the avatar animation has occurred, based on the environment information obtained through the environment information obtaining unit 1100.

The environment recognition module 1330 may include the spatial information identification module 1331, a location change identification module 1333, the concentration level check module 1335, and an utterance mode change module 1337.

The spatial information identification module 1331 may identify the spatial information, based on the environment information obtained using the camera 1110 or the microphone 1130.

According to an embodiment of the disclosure, the spatial information identification module 1331 may identify the space itself, based on the images obtained through the camera 1110 while the user is speaking, thereby determining whether the space is a public place or a private place. For example, the spatial information identification module 1331 may identify characteristics of the user-utterance space through image analysis of the space detected using the camera 1110, and determine whether the user-utterance space is a public or private place.

Alternatively, the spatial information identification module 1331 may identify the number of people included in the images obtained through the camera 1110 while the user is speaking (e.g., recognizing the number of faces in the captured images), based on the obtained images, thereby determining whether the user-utterance place is a public place or a private place. For example, when the number of human faces included in the images captured by the camera 1110 is one, the spatial information identification module 1331 may determine that the user-utterance place is a personal place, and the number of human faces included in the image captured by the camera 1110 is If it is plural, it may be determined that the user-utterance place is a public place.

According to an embodiment of the disclosure, the spatial information identification module 1331 may obtain the loudness of the user-uttered voice, the noise level of the user-utterance space, and the spatial characteristics of the user-utterance space, based on the sound obtained through the microphone 1130 during user utterance. For example, when the absolute magnitude of a user-uttered voice signal obtained through the microphone 1130 is large when the user speaks, the spatial information identification module 1331 may assume that the user speaks loudly because the surroundings are noisy, and thus may determine the user-utterance place as a noisy space. On the other hand, when the absolute magnitude of the user-uttered voice signal obtained through the microphone 1130 is small when the user speaks, the spatial information identification module 1331 may assume that the user speaks quietly because the surroundings are quiet, and thus may determine the user-utterance place as a silent space.

Alternatively, when the user-uttered voice signal obtained through the microphone 1130 when the user speaks includes a lot of noise (for example, when the signal-to-noise ratio (SNR) of a microphone input signal is low), the spatial information identification module 1331 may determine the user-utterance place as a noisy space. On the other hand, when the user-uttered voice signal obtained through the microphone 1130 when the user speaks includes little noise (for example, when the SNR of the microphone input signal is high), the spatial information identification module 1331 may determine the user-utterance place as a quiet space.

According to an embodiment of the disclosure, the spatial information identification module 1331 may obtain the spatial characteristics of the user-utterance space, based on reverberation of the user-uttered voice signal obtained through the microphone 1130 during user utterance or echo characteristics. For example, because reverberation or echo tends to appear strongly in a large space such as a concert hall or auditorium, when the reverberation is large in the user-uttered voice signal obtained through the microphone 1130, the electronic device 1000 may estimate the user-utterance space as a public place.

According to an embodiment of the disclosure, the spatial information of the user-utterance space may be determined as one of a public space, a private-silent space, or a private-noisy space, based on the spatial characteristics.

The interactive avatar providing system according to an embodiment of the disclosure may determine a response mode of the avatar as a honorific mode when user-utterance space characteristics identified by the spatial information identification module 1331 are determined to be a public place (e.g., a public space), and the avatar may utter a response phrase more politely or as if explaining to multiple participants. On the other hand, when the user-utterance space characteristics identified by the spatial information identification module 1331 is not a public place (e.g., a private space), the interactive avatar providing system according to an embodiment of the disclosure may determine the response mode of the avatar as a friendly mode, and the avatar may utter a response phrase as if explaining in more intimate manner to one user. In this case, when the user-utterance space is quiet, the spatial information may be determined as a private-silent space, and thus the avatar may utter a response with a quiet voice and a calm facial expression. On the other hand, when the user-utterance space is noisy, the spatial information may be determined as a private-noisy space, and thus the avatar may utter a response with a loud voice and an exaggerated facial expression.

When the user-utterance space characteristics identified by the spatial information identification module 1331 is not a public space, the interactive avatar providing system according to an embodiment of the disclosure may further customize avatar utterance characteristics to provide an avatar service in a manner more adaptive and suitable for a user uttering environment, that is, an avatar service provision environment.

For example, when the user's location changes (e.g., the location of the user's face or head moves) during utterance of the avatar, the user's concentration level is reduced (e.g., the user's gaze is shaken), or the user manipulates the electronic device 1000 (e.g., adjusts the speaker volume of the electronic device 1000), the electronic device 1000 may identify occurrence of each event and change an avatar response method according to the identified event.

The location change identification module 1333 may identify whether the user's location has changed, based on the environment information obtained through the environment information obtaining unit 1100 during reproduction of the avatar animation.

According to an embodiment of the disclosure, the location change identification module 1333 may identify the change in the user's location by tracking the user's face in the user image obtained through the camera 1110 during reproduction of the avatar animation. For example, when the user moves during reproduction of the avatar animation, the location change identification module 1333 may identify that the user's location has changed, based on a result of the face tracking using the camera 1110, and the environment recognition module 1330 may identify that a certain event to change the avatar animation currently being reproduced has occurred.

When occurrence of the certain event to change the avatar animation is identified, the environment recognition module 1330 transmits event information to the avatar animation module 1350. The event information may include whether the certain event has occurred, the type of event, and the result of the face tracking. The avatar animation module 1350 may change the avatar animation so that the avatar's face (or head) rotates toward the user or the avatar's eyes observe the user, based on the event information.

The concentration level check module 1335 may check the user's concentration level, based on the environment information obtained through the environment information obtaining unit 1100 during reproduction of the avatar animation.

According to an embodiment of the disclosure, the concentration level check module 1335 may check the user's concentration level, based on the image obtained through the camera 1110 while the avatar animation is being played back.

In detail, the concentration level check module 1335 may check the user's concentration level by detecting a change in the direction of the user's face, based on a result of the face tracking performed through the camera 1110 during reproduction of the avatar animation, or by detecting pitch rotation and yaw rotation of the user's eyes (or pupils), based on the result of eye tracking. For example, when it is measured that a change period of the user's face direction is shortened, the user's face direction is downward, or the eyes are directed in a direction other than the avatar, the concentration level check module 1335 may determine that the user's concentration level has decreased.

When it is determined that the user's concentration level has decreased, the environment recognition module 1330 transmits the event information to the avatar animation module 1350. The event information may include whether the certain event has occurred, the type of event, and the result of the concentration level tracking. The avatar animation module 1350 may insert an animation capable of arousing the user's attention, after stopping the avatar animation currently being played back, based on the event information.

The utterance mode change module 1337 may identify whether the user's utterance mode has been changed, based on the environment information obtained through the environment information obtaining unit 1100 during reproduction of the avatar animation, and may change the avatar animation currently being played back, based on the changed utterance mode.

According to an embodiment of the disclosure, the utterance mode change module 1337 may determine whether to change the utterance mode of the avatar, based on an input of the speaker volume adjuster 1150 while the avatar animation is being played back. When the input of the speaker volume adjuster 1150 is identified, the environment recognition module 1330 may determine whether to change the avatar's utterance mode, and, when the avatar's utterance mode is changed, may determine that a certain event to change the avatar animation has occurred. When occurrence of the certain event to change the avatar animation is identified, the environment recognition module 1330 transmits event information to the avatar animation module 1350. The event information may include whether the certain event has occurred, the type of event, and the changed utterance mode. When the type of the input of the speaker volume adjuster 1150 is a volume down input, the utterance mode may be determined as a 'whisper' mode, and the avatar animation module 1350 may change the avatar animation to express the facial expression of the avatar in a smaller size. The avatar animation module 1350 may also change the avatar animation to more smoothly express the tone of the avatar's uttered voice.

On the other hand, when the type of the input of the speaker volume adjuster 1150 is a volume up input, the utterance mode may be determined as a 'presentation' mode, and the avatar animation module 1350 may change the avatar animation to express the facial expression of the avatar more exaggeratedly. The avatar animation module 1350 may also change the avatar animation to more strongly express the tone of the avatar's uttered voice.

The avatar animation module 1350 generates the avatar animation, based on the avatar voice answer and the avatar facial expression data.

According to an embodiment of the disclosure, the avatar animation module 1350 may generate the avatar facial expression data, based on the avatar voice answer and the avatar facial expression sequence corresponding to the avatar voice answer, which are generated based on the user-uttered voice and the spatial information. The avatar animation module 1350 may receive the avatar voice answer and the avatar facial expression sequence from the server 3000.

According to an embodiment of the disclosure, the avatar animation module 1350 may generate the avatar animation, based on the avatar voice answer and the avatar facial expression data.

According to an embodiment of the disclosure, the avatar animation module 1350 may change the avatar facial expression data and the avatar voice answer, based on event information generated during reproduction of the avatar animation, and may change the avatar animation, based on the changed avatar facial expression data.

The avatar animation module 1350 may include a voice expression module 1351 and a facial expression module 1353.

The voice expression module 1351 renders a voice to be uttered by the avatar, based on the avatar voice answer.

According to an embodiment of the disclosure, the voice expression module 1351 may render the voice to be uttered by the avatar, based on the avatar voice answer generated based on the user-uttered voice and the spatial information. The voice expression module 1351 may receive the avatar voice answer from the server 3000.

According to an embodiment of the disclosure, the voice expression module 1351 may change the voice to be uttered by the avatar, based on the event information generated during reproduction of the avatar animation.

For example, when it is identified as a result of checking of the user's concentration level by the concentration level check module 1335 that the user's concentration level has decreased, the environment recognition module 1330 may transmit the event information to the avatar animation module 1350, and the avatar animation module 1350 may stop the avatar animation currently-being played back, and then may insert an animation (for example, a refresh mode animation) capable of arousing the user's attention. Accordingly, the voice expression module 1351 may insert a voice corresponding to the refresh mode animation.

For example, when it is identified as a result of determination of whether the utterance mode has changed by the utterance mode change module 1337 that the avatar's utterance mode has changed, the environment recognition module 1330 may transmit the event information to the avatar animation module 1350, and the voice expression module 1351 may change the tone of the avatar's voice answer, based on the avatar's utterance mode.

The facial expression module 1353 generates the avatar facial expression data, and renders the avatar's facial expression, based on the avatar facial expression data.

According to an embodiment of the disclosure, the facial expression module 1353 may generate the avatar facial expression data, based on the avatar voice answer and the avatar facial expression sequence corresponding to the avatar voice answer, which are generated based on the user-uttered voice and the spatial information, and may render the avatar's facial expression, based on the generated avatar facial expression data.

According to an embodiment of the disclosure, the facial expression module 1353 may change the avatar's facial expression, based on the event information generated during reproduction of the avatar animation.

The facial expression module 1353 may include a lip sync module 1355, and the lip sync module 1355 may include a lip sync model 1357.

According to an embodiment of the disclosure, the lip sync module 1355 generates avatar lip sync data, and renders the avatar's facial expression, based on the avatar facial expression data and the avatar lip sync data, to thereby synchronize the avatar's voice utterance with the avatar's mouth shape.

The avatar facial expression data refers to information for rendering the avatar's facial expression. The avatar lip sync data refers to information for expressing the mouth (or lips) and chin among the avatar facial expression data, and the lip sync module 1355 renders parts related to the mouth, lips, and chin of the avatar's face.

The avatar facial expression data is information about a reference 3D mesh model for rendering the avatar's facial expression, and may include a group of coefficients for each of a plurality of reference 3D meshes. When the avatar facial expression data is blendshape information, the lip sync data may refer to coefficients of specific blend shapes related to a mouth shape selected from among a total of 157 blendshape coefficients.

According to an embodiment of the disclosure, the lip sync model 1357 may be trained by a voice file, may output inferred lip sync data when the avatar voice answer is input, and may include an RNN model and a CNN model. The RNN model may extract speech features when the avatar's voice answer is input, and the CNN model may infer blend shapes and lip sync data about the avatar's facial expression corresponding to the avatar's voice answer by using the speech features extracted from the RNN model.

The lip sync model 1357 according to an embodiment of the disclosure may be trained using the avatar facial expression data and the lip sync data. This training may be performed after training data is pre-processed using the available range of blend shapes for a specific facial expression (or emotion).

The structure and training method of the lip sync model 1357 according to an embodiment of the disclosure will be described in more detail with reference to FIGS. 8 through 10.

The processor 1400 controls the overall operation of the electronic device 1000. For example, the processor 1400 may control a function of the electronic device 1000 for providing an avatar service in the present specification, by executing the programs stored in the storage 1300.

The processor 1400 may include hardware components that perform arithmetic, logic, input/output operations and signal processing. The processor 1400 may include, but is not limited to, at least one of a CPU, a microprocessor, a GPU, application specific integrated circuits (ASICs), digital signal processors (DSPs), digital signal processing devices (DSPDs), programmable logic devices (PLDs), field programmable gate arrays (FPGAs), or other computation circuits.

According to an embodiment of the disclosure, the processor 1400 may include, but is not limited to, an AI processor for generating a learning network model. According to an embodiment of the disclosure, the AI processor may be realized as a chip separate from the processor 1400. According to an embodiment of the disclosure, the AI processor may be a general-use chip.

The communication interface 1500 may support establishment of a wired or wireless communication channel between the electronic device 1000 and another external electronic device (not shown) or the server 3000 and communication through the established communication channel. According to an embodiment of the disclosure, the communication interface 1500 may receive data from the other external electronic device (not shown) or the server 3000 through wired or wireless communication, or may transmit data for the other external electronic device (not shown) or the server 3000.

The communication interface 1500 may transmit and receive information necessary for the electronic device 1000 to provide an avatar service to and from the server 3000. The communication interface 1500 may communicate with another device (not shown) and another server (not shown) in order to provide an avatar service.

According to various embodiments of the disclosure, the communication interface 1500 may include a wireless communication module (e.g., a cellular communication module, a short-distance wireless communication module, or a global navigation satellite system (GNSS) communication module) or a wired communication module (e.g., a local area network (LAN) communication module or a power line communication module), and may communicate with the other external electronic device (not shown) or the server 3000 through at least one network, for example, a short-range communication network (e.g., Bluetooth, WiFi direct, or infrared data association (IrDA)) or a long-distance communication module (e.g., a cellular network, the Internet, or a computer network (e.g., a LAN or WAN)) by using any one of the aforementioned communication modules.

Figure 3:
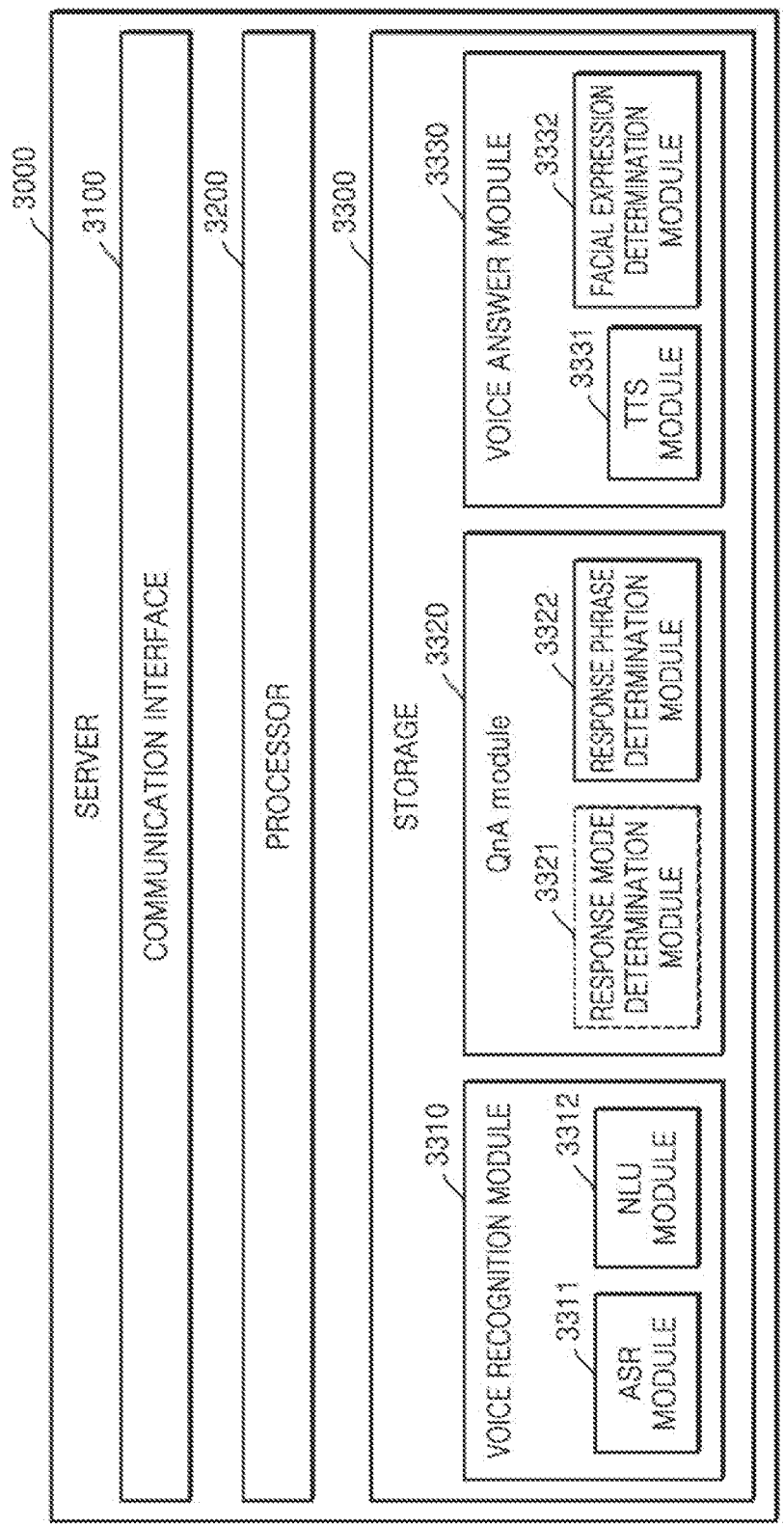
FIG. 3 is a block diagram of a server according to an embodiment.

FIG. 3 is a block diagram of the server 3000 according to an embodiment of the disclosure.

Referring to FIG. 3, the server 100 may include a communication interface 3100, a processor 3200, and a storage 3300.

According to an embodiment of the disclosure, the processor 3200 may be referred to as at least one processor, and thus may be understood as a component that controls operations with respect to other components of the server 3000. According to various embodiments of the disclosure, the configuration of the server 3000 is not limited to that shown in FIG. 3, and may additionally include components not shown in FIG. 3 or may omit some of the components shown in FIG. 3. For example, the server 3000 may further include a separate processor, e.g., an NPU, for an AI model, e.g., at least one learning model. As another example, at least a part of a question and answering (QnA) module 3320 included in the storage 3300 may be implemented as a separate hardware module instead of a software module stored in the storage 3300.

The communication interface 3100 may support establishment of a wired or wireless communication channel between the server 3000 and another external server (not shown) or the electronic device 1000 and communication through the established communication channel. According to an embodiment of the disclosure, the communication interface 3100 may receive data from the other external server (not shown) or the electronic device 1000 through wired or wireless communication, or may transmit data for the other external server (not shown) or the electronic device 1000.

The communication interface 3100 may transmit and receive information necessary for the server 3000 to provide an avatar service to and from the electronic device 1000. The communication interface 3100 may communicate with another device (not shown) and another server (not shown) in order to provide an avatar service.

According to various embodiments of the disclosure, the communication interface 3100 may include a wireless communication module (e.g., a cellular communication module, a short-distance wireless communication module, or a GNSS communication module) or a wired communication module (e.g., a LAN communication module or a power line communication module), and may communicate with the other external electronic device (not shown) or the server 3000 through at least one network, for example, a short-range communication network (e.g., Bluetooth, WiFi direct, or IrDA) or a long-distance communication module (e.g., a cellular network, the Internet, or a computer network (e.g., a LAN or WAN)) by using any one of the aforementioned communication modules.

The processor 3200 controls the overall operation of the server 3000. For example, the processor 3200 may control a function of the server 3000 for providing an avatar service in the present specification, by executing the programs stored in the storage 3300, which will be described later.

The processor 3200 may include hardware components that perform arithmetic, logic, input/output operations and signal processing. The processor 3200 may include, but is not limited to, at least one of a CPU, a microprocessor, a GPU, application specific integrated circuits (ASICs), digital signal processors (DSPs), digital signal processing devices (DSPDs), programmable logic devices (PLDs), field programmable gate arrays (FPGAs), or other computation circuits.

According to an embodiment of the disclosure, the processor 3200 may include, but is not limited to, an AI processor for generating a learning network model. According to an embodiment of the disclosure, the AI processor may be realized as a chip separate from the processor 3200. According to an embodiment of the disclosure, the AI processor may be a general-use chip.

The storage 3300 may store programs to perform processing and controlling by the processor 3200. The storage 3300 may include at least one type of storage medium from among a flash memory type storage medium, a hard disk type storage medium, a multimedia card micro type storage medium, a card type memory (for example, SD or XD memory), a random access memory (RAM), a static RAM (SRAM), a read-only memory (ROM), an electrically erasable programmable ROM (EEPROM), a programmable ROM (PROM), a magnetic memory, a magnetic disk, and an optical disk.

The programs stored in the storage 3300 may be classified into a plurality of modules according to their functions. For example, the storage 3300 may include a voice recognition module 3310, the QnA module 3320, and a voice answer module 3330.

Representative example of technology used for an avatar service through voice recognition include voice recognition technology, voice understanding technology, and voice synthesis technology. A voice recognition avatar service may be implemented by complexly and organically combining various data with technologies.

Linguistic understanding is a technology that recognizes and applies/processes human language/character, and thus includes natural language processing (NLP), machine translation, a dialog system, QnA, and speech recognition/synthesis, etc.

The voice recognition module 3310 may include an ASR module 3311 and an NLU module 3312, and may recognize the user-uttered voice, based on the user-uttered voice information received from the electronic device 1000, and ascertain the meaning of the user-uttered voice through natural language processing.

ASR is a speech-to-text (STT) technology that converts voice into text. The ASR module 3311 may receive the user-uttered voice information from the electronic device 1000, and convert a voice part into computer-readable text by using an ASR model.

NLU, which is a branch of NLP that involves conversion of a human language into a format that machines can understand, plays a role in structuring a human language so that the human language may be understood by machines. The NLU module 3312 may obtain the user's utterance intention by converting raw text, which is unstructured data obtained by the ASR module 3311, into structured data and interpreting the structured data by using the NLU model.

The ASR model or the NLU model may be an AI model. The AI model may be processed by an AI-only processor designed with a hardware structure specialized for processing the AI model. The AI model may be created through learning.

The QnA module 3320 may include a response mode determination module 3321 and a response phrase determination module 3322, and determines the response mode of the avatar, based on an output of the voice recognition module 3310 and the spatial information received from the electronic device 1000, and determines a response phrase, based on the output of the voice recognition module 3310 and the response mode.

The spatial information received from the electronic device 1000 may be spatial information itself identified by the spatial information identification module 1331, or may be user-utterance space characteristic information extracted from the spatial information identified by the spatial information identification module 1331. The QnA module 3320 may determine the avatar's response mode, based on the spatial information received from the electronic device 1000, and may determine the response phrase, based on the output of the voice recognition module 3310 and the response mode.

According to an embodiment of the disclosure, the avatar's basic response mode based on the user-utterance space characteristics may be determined as one of the honorific mode, the friendly mode, the whisper mode, the normal mode, and the presentation mode, based on the spatial information received from the electronic device 1000 (e.g., a public space mode, a private-silent space mode, or a private-noisy space mode.

According to an embodiment of the disclosure, when the user-utterance space characteristics identified by the spatial information identification module 1331 is determined to be a public place (e.g., a public space), the response mode determination module 3321 may determine the response mode of the avatar as the honorific mode. In this case, the avatar may utter the response phrase more politely or as if explaining to multiple participants. On the other hand, when the user-utterance space is not a public place (i.e., is a private space), the response mode determination module 3321 may determine the response mode of the avatar as the friendly mode. In this case, the avatar may utter the response phrase as if explaining it in more friendly manner to one user. In this case, when the user-utterance space is quiet, the spatial information may be determined as a private-silent space, and thus the avatar may utter a response with a quiet voice and a calm facial expression. On the other hand, when the user-utterance space is noisy, the spatial information may be determined as a private-noisy space, and thus the avatar may utter a response with a loud voice and an exaggerated facial expression.

According to an embodiment of the disclosure, the electronic device 1000 may determine the avatar's response mode, based on the spatial information identified by the spatial information identification module 1331, and may transmit the determined avatar's response mode to the server 3000. In this case, the QnA module 3320 may determine the response phrase, based on the avatar's response mode received from the electronic device 1000.

The response phrase determination module 3322 may determine the avatar's response phrase, based on the output of the NLU module 3312 and the output of the response mode determination module 3321, and may use natural language generation (NLG) technology.

NLG, which is a branch responsible for one axis of NLP along with NLU, refers to a technology of expressing a calculation result of a system in human language, as opposed to the NLU technology of understanding the human language and bringing it into the realm of calculation. Early NLG has high computational complexity and requires numerous templates and domain rules, but various problems were resolved with the development of deep learning, especially, RNN technology. An NLG model may be an AI model.

The voice answer module 3330 may include a text-to-speech (TTS) module 3331 and a facial expression determination module 3332, and generates the avatar's voice answer and the avatar's facial expression sequence corresponding to the avatar's voice answer, based on the output of the QnA module 3320.

In TTS, which is a technology of converting text into voice, when a voice recognition avatar service is used, the avatar's voice answer output through a speaker may be generated. In this case, it is necessary to appropriately adjust the speed, pitch, or tone of the voice of the avatar as if a real person speaks.

The TTS module 3331 may convert a response phrase determined by the response phrase determination module 3322 into speech to generate a voice answer, and may determine the speed, pitch, or tone of the voice answer, based on the response method determined in the response mode determination module 3321.

The facial expression determination module 3332 may determine the facial expression of the avatar, based on the response phrase determined by the response phrase determination module 3322 and the answer method determined by the response mode determination module 3321. At this time, the facial expression determination module 3332 may determine a facial expression sequence for the avatar's facial expression that changes in response to the output of the TTS module 3331, that is, the avatar's voice answer.

Each module included in the server 3000 may obtain a result of an external server or $3^{rd}$ party by using an external API when the result of the external server or $3^{rd}$ party is needed, and may generate the output of the server 3000 by using the obtained result of the external server or $3^{rd}$ party.

Figure 4:
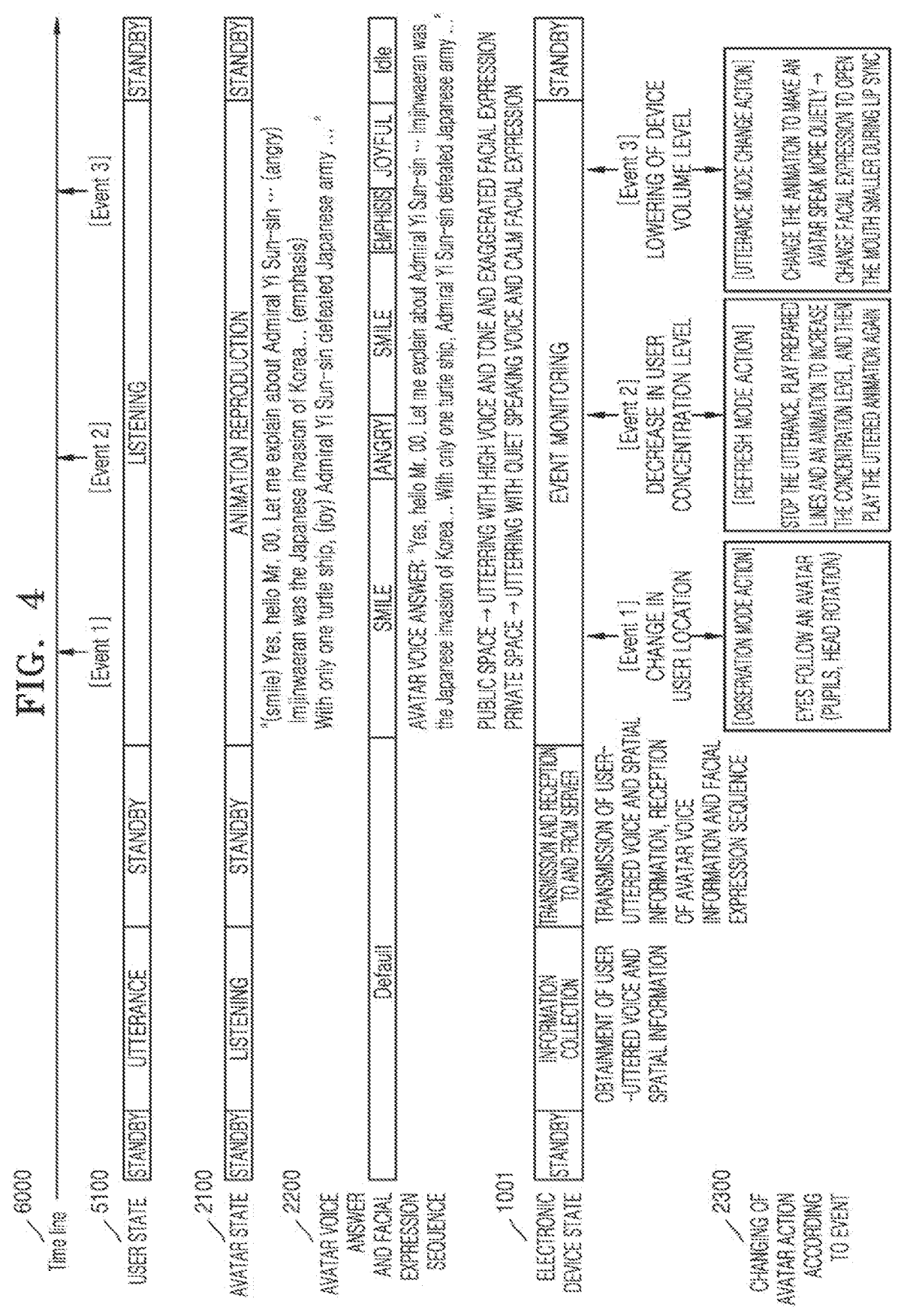

FIG. 4 is a diagram for explaining a change in an avatar response according to a time flow and circumstances, in an interactive avatar providing system according to an embodiment of the disclosure.

Referring to FIG. 4, an avatar voice answer and facial expression sequence 2200 may be determined based on a user state 5100 and an avatar state 2100 according to the lapse of time 6000. An avatar action may be determined based on occurrence or non-occurrence of an event and an event type identified by the electronic device 1000 in an event monitoring state, and an avatar animation may be changed. In FIG. 4, overlapping descriptions of structures and operations of the electronic device 1000 of FIG. 2 and the server 3000 of FIG. 3 are omitted or briefly given.

The electronic device state 1001 may be determined based on the user state 5100 and the avatar state 2100. In a state in which a user is not interacting with an avatar, that is, in a standby state, the electronic device 1000 may also wait for the user's utterance in a standby state. When the user 5000 utters a certain voice for interaction with the avatar, the electronic device 1000 may obtain the user's uttered voice and the spatial information of the user-utterance space.

According to an embodiment of the disclosure, the spatial information identification module 1331 of the electronic device 1000 may identify the spatial information, based on the environment information obtained using the camera 1110 or the microphone 1130. According to an embodiment of the disclosure, the avatar's basic response mode based on the user-utterance space characteristics may be determined as one of the honorific mode, the friendly mode, the whisper mode, the normal mode, and the presentation mode, based on the spatial information identified by the spatial information identification module 1331 (e.g., a public space mode, a private-silent space mode, or a private-noisy space mode). The electronic device 1000 transmits the obtained user-uttered voice and the obtained spatial information to the server 3000 of FIG. 1, and receives the avatar voice answer and the facial expression sequence from the server 3000 of FIG. 1.

For example, when the user 5000 utters a voice saying "xx, explain about Admiral Yi Sun-sin", the electronic device 1000 obtains the user-uttered voice and the spatial information while the user 5000 is speaking. In the avatar state 2100, an animation of listening to the utterance of a user may be played back. The electronic device 1000 transmits the obtained user-uttered voice and the obtained spatial information to the server 3000 of FIG. 1, and receives the avatar voice response and the facial expression sequence from the server 3000 of FIG. 1.

In this case, the avatar voice answer received from the server 3000 may be determined as "Yes, hello Mr. 00. Let me explain about Admiral Yi Sun-sin . . . Imjinwaeran was the Japanese invasion of Korea . . . With only one turtle ship, Admiral Yi Sun-sin defeated Japanese army . . . ". The avatar facial expression sequence may be determined as {(smile), (angry), (smile), (emphasis), (joy), . . . }, and may be synchronized with the avatar voice answer and reproduced as an avatar animation. For example, the avatar facial expression sequence may be synchronized with the avatar voice answer, like "(smile) Yes, hello Mr. 00. Let me explain about Admiral Yi Sun-sin . . . (angry) Imjinwaeran was the Japanese invasion of Korea . . . (emphasis) With only one turtle ship, (joy) Admiral Yi Sun-sin defeated Japanese army . . . ".

The electronic device 1000 providing an avatar service, according to an embodiment of the disclosure, may monitor the user's state or occurrence of an event even during reproduction of an avatar animation according to the user's utterance, and, when occurrence of a certain event is identified as a result of the monitoring, may change the avatar's action.

For example, the electronic device 1000 may identify whether the user's location has changed, by using the location change identification module 1333. When it is identified that the location of the user 5000 has changed at t=[event 1] during reproduction of the avatar animation, the electronic device 1000 may modify the avatar facial expression data to modify the avatar animation currently-being reproduced so that the avatar's eyes or the avatar's face (or head) follows a movement of the avatar (e.g., an observation mode action).

As another example, the electronic device 1000 may check the concentration level of the user by using the concentration level check module 1335. When it is identified that the concentration level of the user 5000 has decreased at t=[event 2] during reproduction of the avatar animation, the electronic device 1000 may stop the avatar animation currently being reproduced, and then may insert a certain avatar animation capable of arousing the user's attention (e.g., a refresh mode action). When the reproduction of the certain avatar animation ends, the electronic device 1000 may again reproduce the avatar animation played before the refresh mode action is performed.

As another example, the electronic device 1000 may identify whether the avatar's utterance mode has changed, by using the utterance mode change module 1337. When an input of the speaker volume adjuster 1150 is identified at t=[event 3] during reproduction of the avatar animation, the electronic device 1000 may identify whether the avatar's utterance mode has changed, and may modify the avatar animation according to the changed avatar's utterance mode (for example, an utterance mode change action). When the type of the input of the speaker volume adjuster 1150 is a volume down input and, as a result, a volume level is less than or equal to a preset first threshold value, the utterance mode may be determined as a 'whisper' mode, and the avatar animation module 1350 may change the avatar animation to express the facial expression of the avatar in a smaller size and express the tone of the avatar's uttered voice more smoothly. On the other hand, when the type of the input of the speaker volume adjuster 1150 is a volume up input and, as a result, the volume level is equal to or greater than a preset second threshold value, the utterance mode may be determined as a 'presentation' mode, and the avatar animation module 1350 may change the avatar animation to express the facial expression of the avatar in a larger size and express the tone of the avatar's uttered voice more strongly.

FIG. 5 is a flowchart of an avatar providing method performed by an electronic device according to an embodiment of the disclosure.

Referring to FIG. 5, the electronic device 1000 according to an embodiment of the disclosure may provide an avatar service based on the user-utterance space characteristics, and may change an avatar animation, based on an event occurring during reproduction of the avatar animation. A repeated description of FIG. 5 that is the same as that given above with reference to FIGS. 2 through 4 is omitted or briefly given herein.

In operation 501, the electronic device 1000 obtains the user-uttered voice information and the spatial information of the user-utterance space.

The electronic device 1000 according to an embodiment of the disclosure may obtain the user-uttered voice input using the microphone 1130, and may obtain the spatial information of the user-utterance space by using the microphone 1130 or the camera 1110.

The spatial information identification module 1331 may identify the spatial information, based on the environment information obtained using the camera 1110 or the microphone 1130.

According to an embodiment of the disclosure, the spatial information identification module 1331 may identify a space itself, based on the images obtained through the camera 1110 while the user is speaking, thereby determining whether the space is a public place or a private place. For example, the spatial information identification module 1331 may identify characteristics of the user-utterance space through image analysis of the space detected using the camera 1110, and determine whether the user-utterance space is a public or private place.

According to an embodiment of the disclosure, the spatial information identification module 1331 may obtain the loudness of the user-uttered voice, the noise level of the user-utterance space, and the spatial characteristics of the user-utterance space, from a signal obtained through the microphone 1130 during user utterance.

According to an embodiment of the disclosure, the avatar's response mode based on the user-utterance space characteristics may be determined as one of the honorific mode, the friendly mode, the whisper mode, the normal mode, and the presentation mode, based on the spatial information identified by the spatial information identification module 1331 (e.g., a public space, a private-silent space, or a private-noisy space).

According to an embodiment of the disclosure, the electronic device 1000 may transmit the spatial information of the user-uttered space to the server 3000, and the server 3000 may determine the avatar's response mode, based on the user-utterance space information received from the electronic device 1000.

In operation 502, the electronic device 1000 obtains a first avatar voice answer and an avatar facial expression sequence determined based on the user-uttered voice and the spatial information.

The electronic device 1000 may receive the first avatar voice answer and the avatar facial expression sequence from the server 3000.

According to an embodiment of the disclosure, the electronic device 1000 may transmit the user-uttered voice information and the avatar's response mode to the server 3000. The server 3000 may receive the user-uttered voice information and the avatar's response mode from the electronic device 1000, recognize the received user-uttered voice by ASR, and perform NLU on a result of the recognition of the user-uttered voice to ascertain the meaning of the user-uttered voice. The server 3000 may determine the avatar's response phrase, based on the avatar's response mode, and may determine the first avatar voice answer and the avatar facial expression sequence, based on the avatar's response phrase.

According to an embodiment of the disclosure, the electronic device 1000 may transmit the user-uttered voice information and the spatial information of the user-utterance space to the server 3000, and the server 3000 may receive the user-uttered voice information and the spatial information of the user-utterance space from the electronic device 1000, recognize the received user-uttered voice by ASR, and perform NLU on a result of the recognition of the user-uttered voice to ascertain the meaning of the user-uttered voice. The server 3000 may determine the response mode of the avatar, based on the user-utterance space information received from the electronic device 1000, determine the avatar's response phrase, based on the determined avatar's response mode, and determine the first avatar voice answer and the avatar facial expression sequence, based on the avatar's response phrase.

In operation 503, the electronic device 1000 determines first avatar facial expression data, based on the first avatar voice answer and the avatar facial expression sequence.

According to an embodiment of the disclosure, the avatar animation module 1350 of the electronic device 1000 may generate the avatar animation, based on the avatar voice answer and the avatar facial expression data.

The voice expression module 1351 of the avatar animation module 1350 renders a voice to be uttered by the avatar, based on the avatar voice answer.

According to an embodiment of the disclosure, the voice expression module 1351 may render the voice to be uttered by the avatar, based on the first avatar voice answer generated based on the user-uttered voice and the response mode.

The facial expression module 1353 of the avatar animation module 1350 may generate avatar facial expression data, based on the avatar facial expression sequence corresponding to the avatar voice answer.

The avatar facial expression data refers to information for rendering the avatar's facial expression. The avatar lip sync data refers to information about the mouth (or lips) and chin among the avatar facial expression data, and the lip sync module 1355 renders parts related to the mouth, lips, and chin of the avatar's face.

The avatar facial expression data is information about a reference 3D mesh model for rendering the avatar's facial expression, and may include a group of coefficients for each of a plurality of reference 3D meshes. When the avatar facial expression data is blend shapes, the lip sync data may refer to coefficients of specific blend shapes related to a mouth shape selected from among a total of 157 blendshape coefficients.

In operation 504, the electronic device 1000 reproduces a first avatar animation generated based on the first avatar voice answer and the first avatar expression data.

According to an embodiment of the disclosure, the facial expression module 1353 may render the avatar's face, based on the avatar facial expression data. The avatar facial expression data refers to information for rendering the avatar's facial expression. The avatar lip sync data refers to information about the mouth (or lips) and chin among the avatar facial expression data, and the lip sync module 1355 renders parts related to the mouth, lips, and chin of the avatar's face.

In the electronic device 1000 according to an embodiment of the disclosure, the facial expression module 1353 may include the lip sync module 1355, and the lip sync module 1355 may include the lip sync model 1357. The lip sync module 1355 generates the avatar lip sync data, and renders the avatar's facial expression, based on the avatar facial expression data and the avatar lip sync data, to thereby synchronize the avatar's voice utterance with the avatar's mouth shape.

In operation 505, the electronic device 1000 monitors occurrence of an event.

When a change in an interaction environment between the user and the avatar is identified during reproduction of the first avatar animation, the electronic device 1000 may identify that an event to change the first avatar animation currently being reproduced has occurred.

According to an embodiment of the disclosure, the electronic device 1000 may identify whether a certain event needing to change the avatar animation currently being reproduced has occurred, by using the camera 1110, while the avatar animation is being reproduced. For example, the electronic device 1000 may identify whether the user's location has changed, by using the image captured by the camera 1110 during reproduction of the avatar animation. Alternatively, the electronic device 1000 may identify whether the user's concentration level has decreased, based on the image captured by the camera 1110 during reproduction of the avatar animation. While the avatar animation is being played back, the electronic device 1000 may identify whether to change an utterance mode of the avatar animation currently being played back, based on an input of the speaker volume adjuster 1150.

In operation 506, the electronic device 1000 determines second avatar facial expression data or a second avatar voice answer, based on the identified event.

According to an embodiment of the disclosure, when the user's location has changed during reproduction of the avatar animation, the electronic device 1000 may determine second avatar facial expression data used for the avatar to operate in an 'observation mode' in which the avatar's face (or head) direction or eyes follows the user's location.

Alternatively, the electronic device 1000 may identify whether the user's concentration level has decreased, based on the image captured through the camera 1110 during reproduction of the avatar animation, and may determine second avatar facial expression data and second avatar voice information used for the avatar to operate in a 'refresh mode' in which an animation capable of calling the user's attention is reproduced.

While the avatar animation is being reproduced, the electronic device 1000 may determine the second avatar facial expression data and the second avatar voice answer in a changed 'utterance mode', based on whether the utterance mode of the avatar animation currently being reproduced has changed. For example, when the user requests to lower a speaker volume during reproduction of the avatar animation, namely, when a speaker volume down input is obtained, the electronic device 1000 may determine that the user wants to listen to a response of the avatar with a lower volume, and thus the electronic device 1000 may change the avatar animation to a whispering facial expression and a whispering voice.

In operation 507, the electronic device 1000 may stop reproduction of the first avatar animation. In operation 508, the electronic device 1000 may reproduce a second avatar animation generated based on the second avatar facial expression data or the second avatar voice answer.

According to an embodiment of the disclosure, when the event identified by the electronic device 1000 is an 'observation mode', the second avatar animation may be an animation that has the same user-uttered voice as the first avatar animation but operates such that the avatar's face (or head) or eyes follows the user's location.

Alternatively, when the event identified by the electronic device 1000 is a 'refresh mode', the second avatar animation may be an animation that is reproduced by stopping the first avatar animation and inserting an animation capable of calling the user's attention and is reproduced again from the moment when the first avatar animation is stopped.

When the event identified by the electronic device 1000 is a 'utterance mode change', the second avatar animation may be an animation in which the contents of the avatar's uttered voice is the same as the first avatar animation but the tone of the avatar's uttered voice and the avatar's facial expression has changed according to the avatar's utterance mode.

FIG. 6 is a flowchart of an avatar providing method performed by a server according to an embodiment of the disclosure.

Referring to FIG. 6, the server 3000 according to an embodiment of the disclosure may provide an avatar service based on user-utterance space characteristics together with the electronic device 1000. A repeated description of FIG. 6 that is the same as that given above with reference to FIGS. 2 through 5 is omitted or briefly given herein.

In operation 601, the server 3000 receives the user-uttered voice information and the spatial information of the user-utterance space from the electronic device 1000.

The electronic device 1000 according to an embodiment of the disclosure may obtain the user-uttered voice input using the microphone 1130 of the environment information obtaining unit 1100, may obtain the spatial information of the user-utterance space by using the microphone 1130 or the camera 1110, and may transmit the obtained user-uttered voice information and the obtained spatial information of the user-utterance space to the server 3000.

In operation 602, the server 3000 obtains an avatar response mode.

The server 3000 according to an embodiment of the disclosure may obtain the avatar's response mode, based on the spatial information received from the electronic device 1000.

According to an embodiment of the disclosure, the server 3000 may receive, from the electronic device 1000, the avatar's response mode determined based on the spatial information of the user-utterance space.

According to an embodiment of the disclosure, the avatar's response mode based on the user-utterance space characteristics may be determined as one of the honorific mode, the friendly mode, the whisper mode, the normal mode, and the presentation mode, based on the spatial information identified by the spatial information identification module 1331 (e.g., a public mode, a private-silent mode, or a private-noisy mode, etc.).

In operation 603, the server 3000 determines the avatar response phrase, based on the user-uttered voice and the response mode.

The server 3000 according to an embodiment of the disclosure may receive the user-uttered voice from the electronic device 1000, recognize the received user-uttered voice by ASR, and perform NLU on a result of the recognition of the user-uttered voice to ascertain the meaning of the user-uttered voice. The server 3000 may obtain the avatar's response mode, and may determine the avatar's response phrase, based on the avatar response mode and the result of the recognition of the user-uttered voice.

In operation 604, the server 3000 determines the first avatar voice answer and the first avatar facial expression sequence, based on the avatar response phrase. In operation 605, the server 3000 transmits the first avatar voice answer and the first avatar facial expression sequence to the electronic device 1000.

Figure 7A:
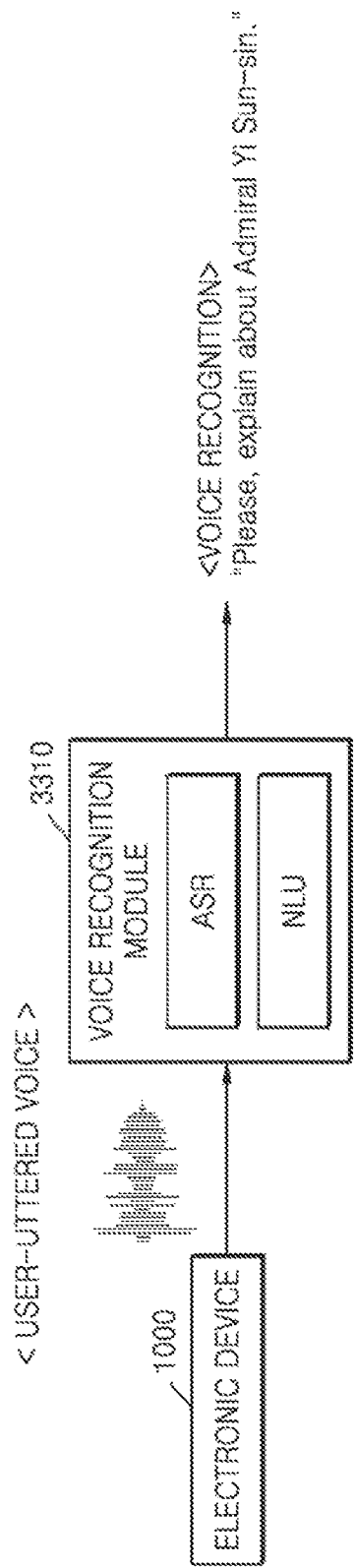
FIGS. 7A, 7B, and 7C are diagrams illustrating data processed by the modules of a server, respectively, in an interactive avatar providing system according to an embodiment.
Figure 7B:
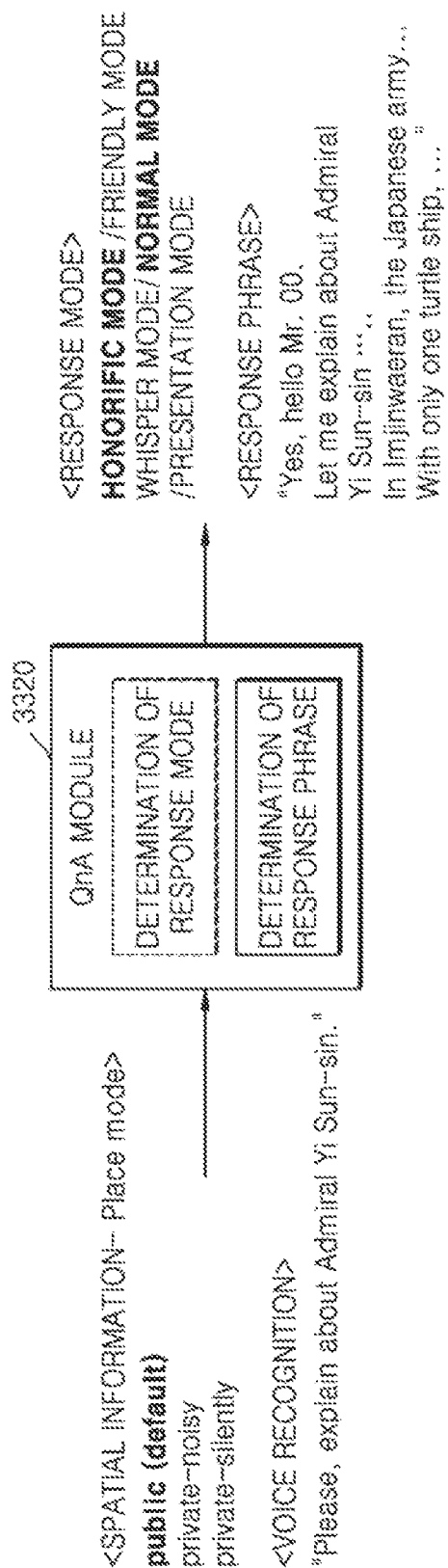
Figure 7C:
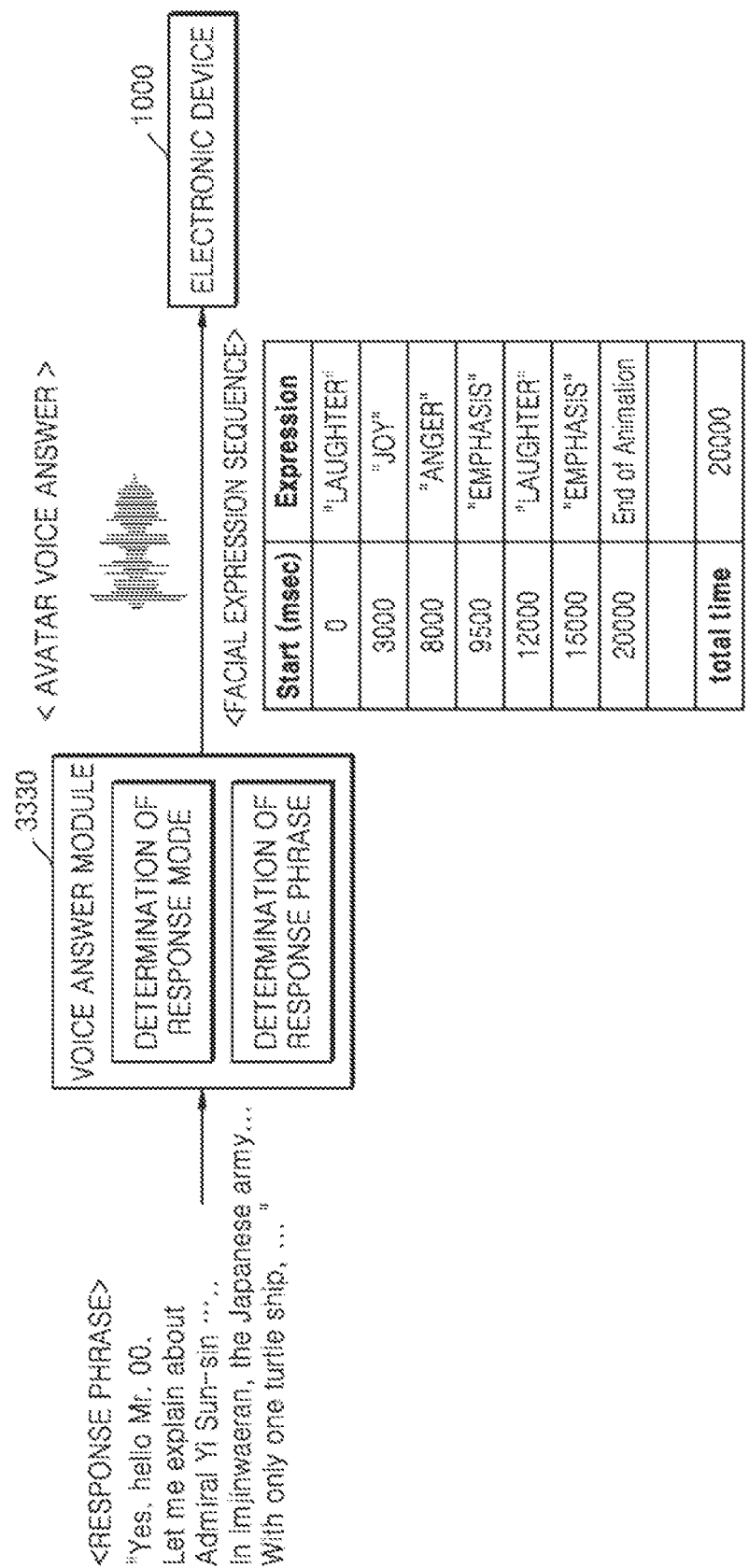

FIGS. 7A, 7B, and 7C are diagrams illustrating data processed by the modules of a server, respectively, in an interactive avatar providing system according to an embodiment of the disclosure.

Referring to FIGS. 7A, 7B, and 7C, the interactive avatar providing system according to an embodiment of the disclosure includes the electronic device 1000 and the server 3000, and the electronic device 1000 transmits the user-uttered voice information and the spatial information of the user-utterance space to the server 3000.

FIG. 7A illustrates input/output data of a voice recognition module in a server according to an embodiment of the disclosure.

The voice recognition module 3310 of the server 3000 according to an embodiment of the disclosure may recognize a voice by performing ASR on the user-uttered voice information received from the electronic device 1000, and may ascertain the meaning of the recognized voice by performing NLU on the recognized voice. In other words, an input of the voice recognition module 3310 may be data of the voice (for example, the volume, frequency, and pitch information of the voice) uttered by the user, which is "Tell me about Admiral Yi Sun-sin", and an output of the voice recognition module 3310 may be a result of interpreting the user-uttered voice.

FIG. 7B illustrates input/output data of a QnA module in a server according to an embodiment of the disclosure.

The QnA module 3320 of the server 3000 according to an embodiment of the disclosure may determine the avatar's response mode, based on the spatial information of the user-utterance space received from the electronic device 1000. For example, when the spatial information of the user-utterance space is a public mode, the avatar's response mode may be determined as a honorific mode or a normal mode. However, the spatial information transmitted by the electronic device 1000 is not limited thereto. According to an embodiment of the disclosure, the electronic device 1000 may transmit information identified from an image obtained through the camera 1110 (e.g., the number of people (faces) included in the obtained image) or information identified from a sound obtained through the microphone 1130. Information (e.g., spatial reverberation time and presence or absence of echo) to the server 3000, and the server 3000 may obtain the spatial information, based on the obtained information, and determine the avatar response mode.

The server 3000 according to an embodiment of the disclosure may determine the avatar's response phrase, based on the output of the voice recognition module 3310 and the determined avatar response mode. For example, when the output of the voice recognition module 3310 is "Tell me about Admiral Yi Sun-sin" and the avatar response mode is the "honorific mode", the avatar response phrase may be determined as "Yes, hello Mr. 00. Let me explain about Admiral Yi Sun-sin . . . In Imjinwaeran, the Japanese army . . . With only one turtle ship, . . . ".

FIG. 7C illustrates input/output data of a voice answer module in a server according to an embodiment of the disclosure.

The voice answer module 3330 of the server 3000 according to an embodiment of the disclosure may determine the avatar's voice answer, based on the avatar's response phrase, which is the output of the QnA module 3320. The voice answer module 3330 of the server 3000 according to an embodiment of the disclosure may determine a facial expression sequence over time, based on the context of the avatar's response phrase. For example, when the total playback time of the response phrase is 20 seconds, the facial expression sequence for each time section may be determined as {0 to 3 seconds of laughter, 3 to 8 seconds of joy, 8 to 9.5 seconds of anger, 9.5 to 12 seconds of emphasis, 12 to 15 seconds of laughter, and 15 to 20 seconds of emphasis}.

Figure 8:
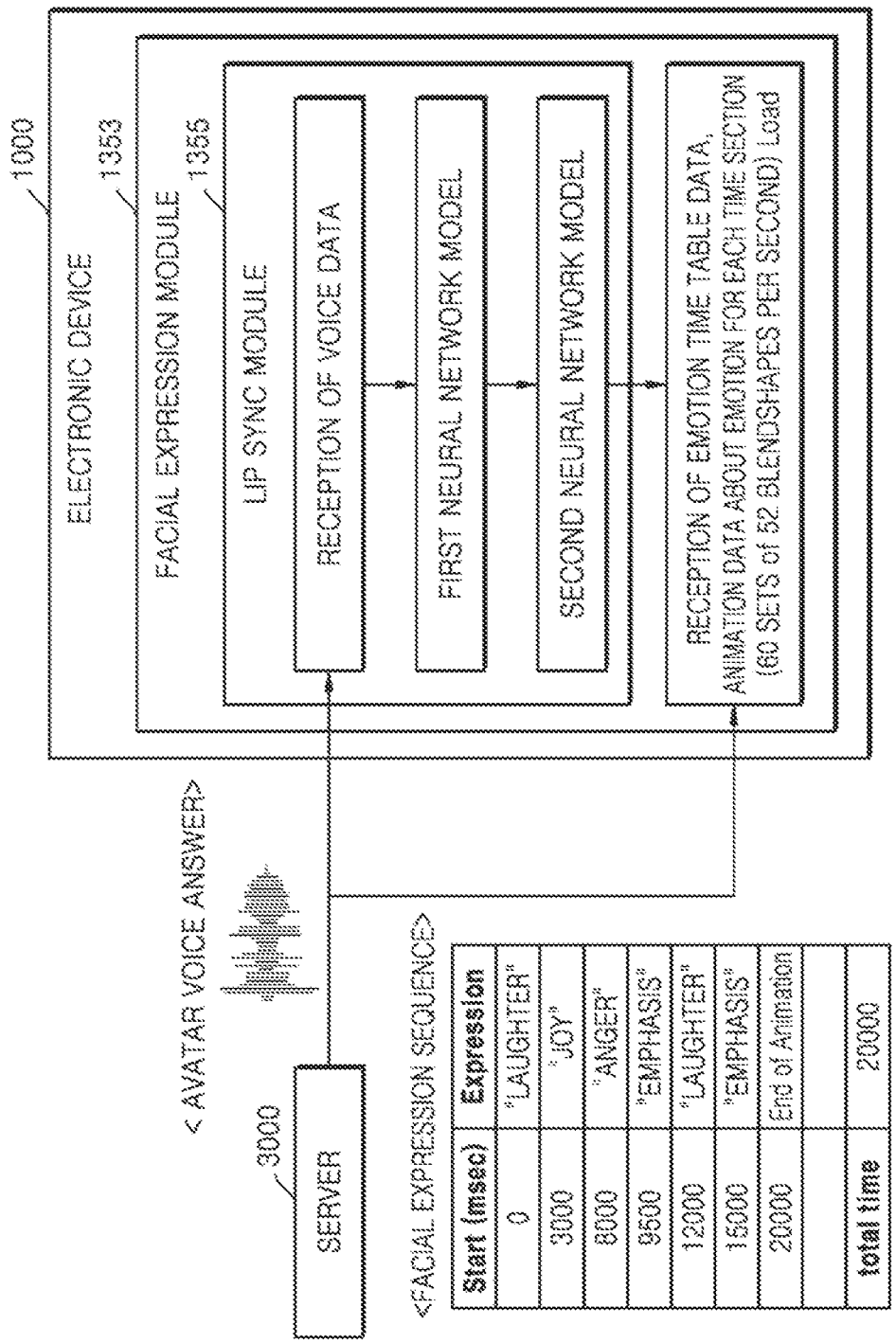
FIG. 8 is a diagram for explaining a method, performed by an electronic device, of processing data used to generate an avatar animation, in an interactive avatar providing system according to an embodiment.

FIG. 8 is a diagram for explaining a method, performed by an electronic device, of processing data used to generate an avatar animation, in an interactive avatar providing system according to an embodiment of the disclosure.

Referring to FIG. 8, the interactive avatar providing system according to an embodiment of the disclosure includes the electronic device 1000 and the server 3000, and the server 3000 transmits the avatar voice answer and the facial expression sequence to the electronic device 1000.

The lip sync module 1355 of the electronic device 1000 according to an embodiment of the disclosure generates the avatar's lip sync data, based on the avatar voice answer.

The lip sync module 1355 of the electronic device 1000 according to an embodiment of the disclosure may convert voice data received using two neural network models into lip sync data. For example, a first neural network model is an RNN model for deep speech processing, and may input speech data consisting of received 22050 decimal data per second to extract speech features. A second neural network model is a CNN model, and may input the extracted speech features to infer avatar lip sync data.

The avatar lip sync data refers to data about the mouth (or lips) and chin among the avatar facial expression data. Even when the avatar utters the same voice, the mouth shape may be expressed differently according to the emotion and facial expression at the time of utterance, so information on the mouth (or lips) and chin used to express the mouth shape is defined as the avatar lip sync data. For example, the avatar facial expression data may be data about the mouth (or lips) and chin, among blend shapes, a morph target, or FACS information.

The facial expression module 1353 of the electronic device 1000 according to an embodiment of the disclosure obtains animation data over time, based on the lip sync data and the facial expression sequence. The obtainment of the animation data may refer to loading a blendshape stored in a memory.

Figure 9:
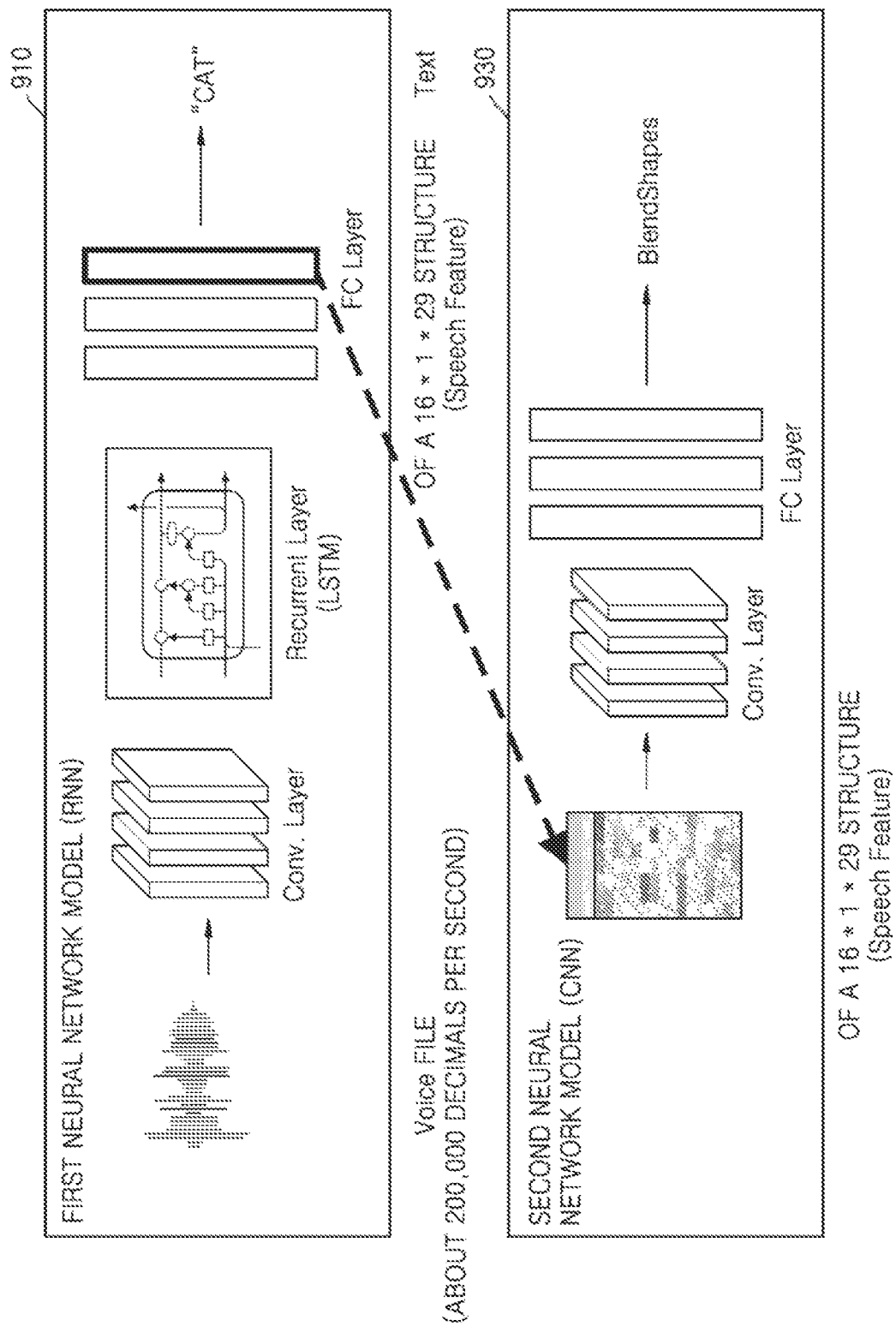
FIG. 9 is a diagram illustrating a neural network model for generating lip sync data, in an interactive avatar providing system according to an embodiment.

FIG. 9 is a diagram illustrating a neural network model for generating lip sync data, in an interactive avatar providing system according to an embodiment of the disclosure.

Referring to FIG. 9, a neural network model for generating lip sync data, according to an embodiment of the disclosure, may include a first neural network model 910 and a second neural network model 930.

The first neural network model 910 may be an RNN model, and may perform deep speech processing of extracting a speech feature consisting of decimal numbers of a 16*1*29 structure from a speech file consisting of about 200,000 decimal numbers per second and converting the speech feature into text. A speech feature may be extracted from speech input to the RNN model 910 through a convolutional layer, a recurrent layer, and a fully connected (FC) layer, and the recurrent layer may be implemented as a long short-term memory (LSTM).

Because voice data is one-dimensional data and requires time-series processing, the voice data is easy to process using an RNN having a structure that receives an output transmitted to an upper layer simultaneously with an input in a next time period and processing the output. The LSTM, which is a technique used to prevent gradient vanishing in RNNs, puts a memory function in a hidden layer and enables the memory to be adjusted (written/erased/output) so that additional information is processed while being delivered to an output of the hidden layer.

The second neural network model 930 may be a CNN model 930, and may perform deep expression processing for inferring lip sync data from a speech feature consisting of decimal numbers of a 16*1*29 structure extracted by the RNN model. Lip sync data may be extracted from the speech feature input to the CNN model 930 through a convolutional layer and an FC layer. The lip sync data may refer to 27 blend shapes for expressing a mouth and lips among 52 blend shapes for expressing a face.

Figure 10:
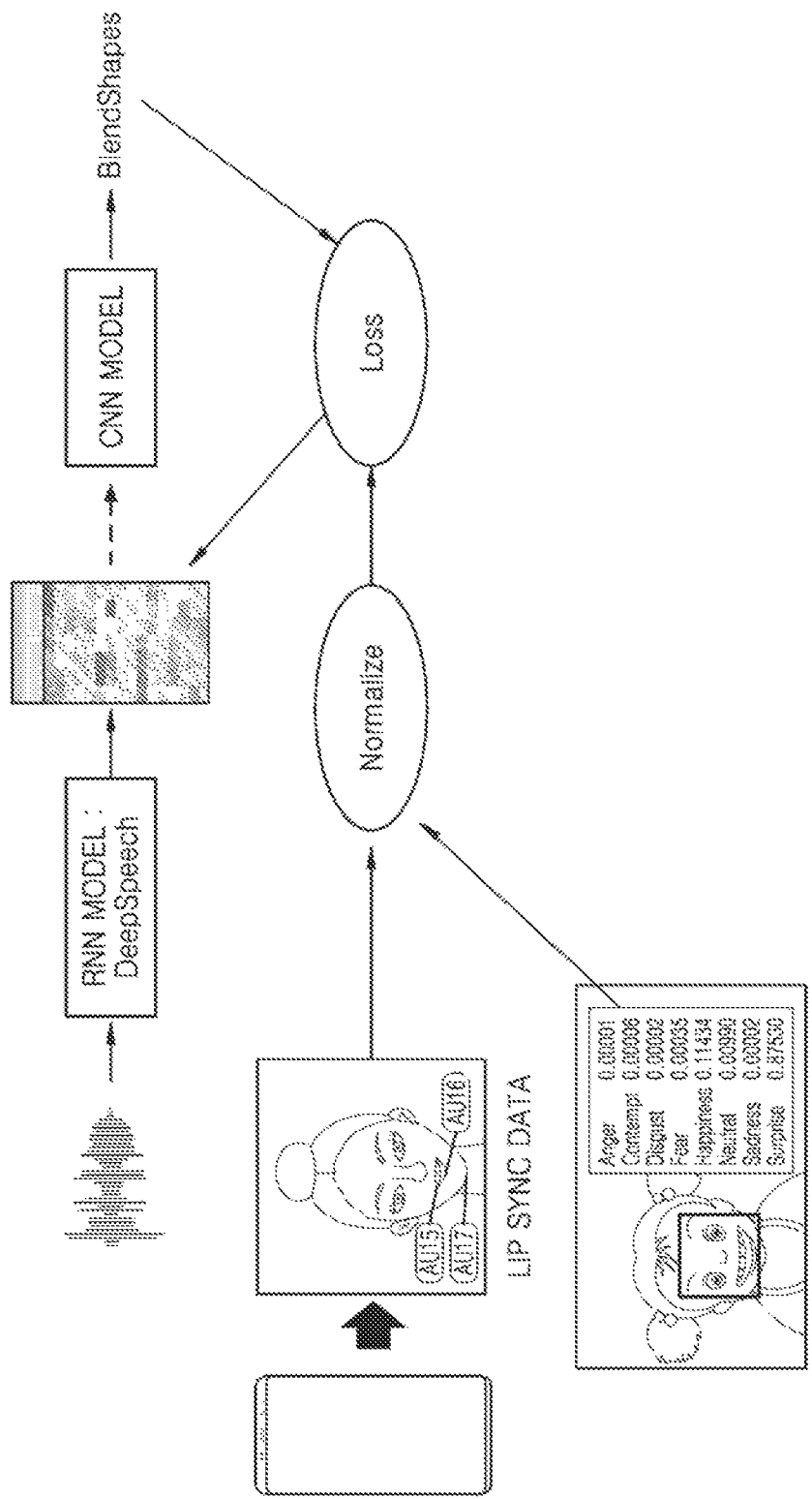
FIG. 10 is a diagram for explaining a method of learning lip sync data, according to an embodiment.

FIG. 10 is a diagram for explaining a method of learning lip sync data, according to an embodiment of the disclosure.

The electronic device 1000 according to an embodiment of the disclosure includes the facial expression module 1353 for expressing the face of an avatar. The lip sync module 1355 uses the lip sync model 1357 to express the mouth and lips, which are the most important parts representing emotions, and the lip sync model 1357 can be trained through learning.

Referring to FIG. 10, when voice data consisting of about 23,000 decimals per second is input, the lip sync model 1357 according to an embodiment of the disclosure may output blendshape sets composed of 60 decimals per second for expressing a face corresponding to the input voice data, and one blendshape set may include lip sync data, which are blend shapes related to the mouth shape. The lip sync model 1357 according to an embodiment of the disclosure may be trained using the input voice data and a loss thereof.

Each loss may be calculated from a prediction value Predict of a CNN model and an actual blendshape value Real using [Equation 1], [Equation 2], and [Equation 3], where ' indicates a previous value and " indicates its previous value.

$$\text{ReconstructionLoss} = \Sigma |(\text{Predict}) - (\text{Real})|/N \quad \text{[Equation 1]}$$

$$\text{VelocityLoss} = \Sigma |(\text{Predict} - \text{Predict}') - (\text{Real} - \text{Real}')|/N \quad \text{[Equation 2]}$$

$$\text{AccelarationLoss} = \Sigma |((\text{Predict} - \text{Predict}') - (\text{Predict}' - \text{Predict}'')) - ((\text{Real} - \text{Real}') - (\text{Real}' - \text{Real}''))|/N \quad \text{[Equation 3]}$$

The calculated loss is used to train the CNN model.

According to an embodiment of the disclosure, the lip sync data may be pre-processed based on the avatar's emotional state or situation. In detail, the lip sync data may be normalized as in [Equation 4] by using a minimum value min and a maximum value max of a blendshape in the emotional state, and the avatar's face may be more accurately expressed using a normal value normalized within an available range instead of the real value.

$$\text{normal} = (\text{real} - \text{min})/(\text{max} - \text{min}) \quad \text{[Equation 4]}$$

Figure 11:
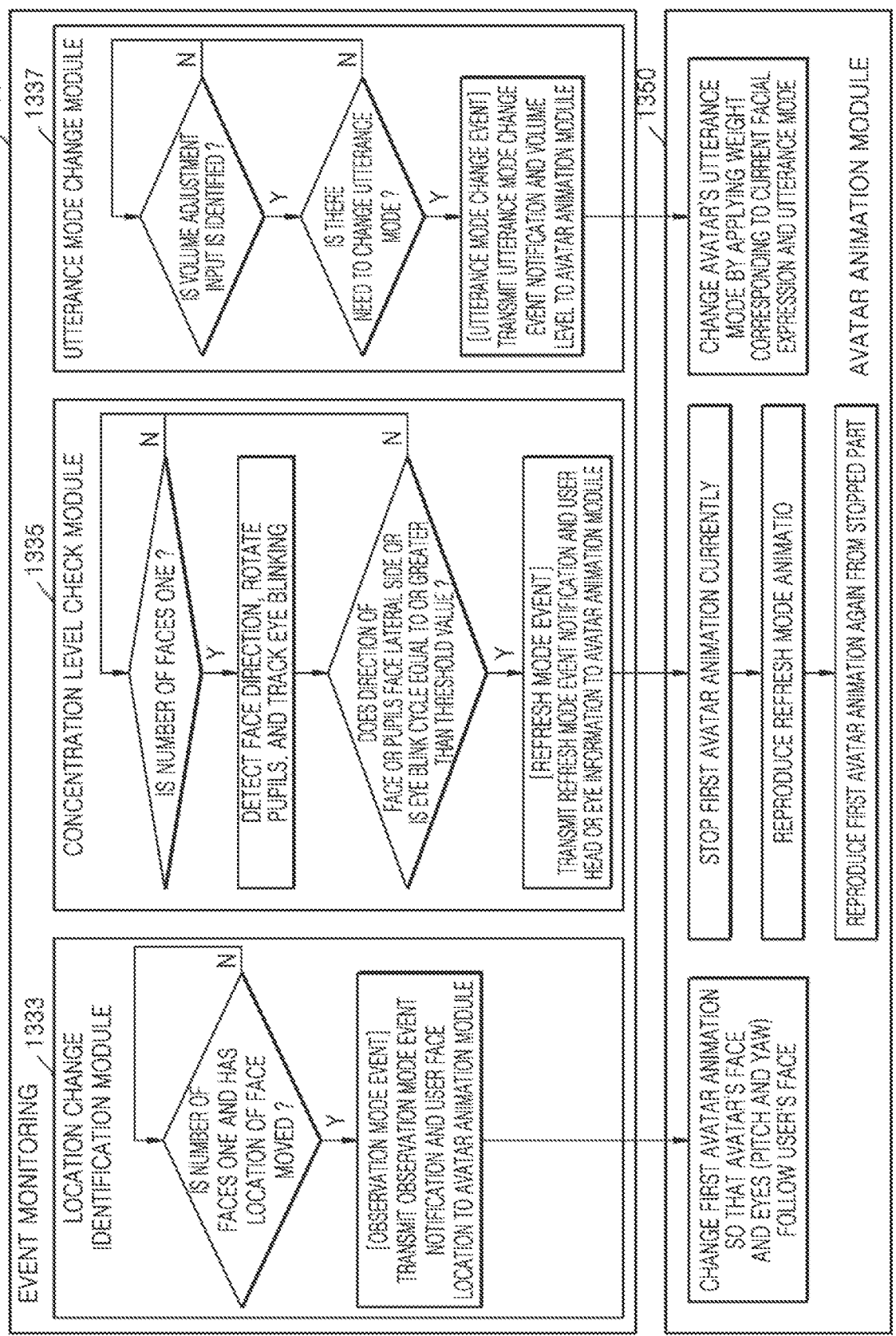
FIG. 11 is a diagram for explaining a method, performed by an electronic device, of identifying an event and changing an avatar animation according to the identified event, according to an embodiment.

FIG. 11 is a diagram for explaining a method, performed by an electronic device according to an embodiment of the disclosure, of identifying an event and changing an avatar animation according to the identified event.

Referring to FIG. 11, the electronic device 1000 according to an embodiment of the disclosure may monitor an event by using the location change identification module 1333, the concentration level check module 1335, and the utterance mode change module 1337 of the environment recognition module 1330, and may determine, create, change, and reproduce an avatar animation by using the avatar animation module 1350.

The environment recognition module 1330 may identify whether a certain event to change the avatar animation has occurred, based on the environment information obtained through the environment information obtaining unit 1100. The avatar animation module 1350 may generate avatar facial expression data based on a result of the event identification received from the environment recognition module 1330 during reproduction of an existing avatar animation (e.g., a first avatar animation), and may generate a new avatar animation based on the avatar facial expression data.

According to an embodiment of the disclosure, the location change identification module 1333 may identify a change in the user's location by tracking the user's face, based on the image obtained through the camera 1110 during reproduction of the avatar animation.

The location change identification module 1333 may analyze the image obtained through the camera 1110 to identify the number of human faces included in the image and whether the location of the human face has moved. When it is determined as a result of the identification that there is only one human face included in the image and the location of the face has moved, the location change identification module 1333 may transmit an observation mode event notification and user face (or head) information to the avatar animation module 1350. The user face (or head) information may include information on the number and locations of identified user faces (or heads). The avatar animation module 1350 may change the first avatar animation currently being reproduced so that the avatar's face (or head) and eyes (pitch and yaw) follow the user's face (or head).

According to an embodiment of the disclosure, the concentration level check module 1335 may check the user's concentration level, based on the image obtained through the camera 1110 while the avatar animation is being reproduced.

The concentration level check module 1335 may identify the number of human faces included in an image analysis resultant image obtained through the camera 1110, and, when the number of human faces is one and the direction of the face or pupils does not face the front or an eye blink cycle is equal to or greater than a preset threshold value as a result of detection of a face direction or rotation (roll, pitch, and yaw), the pupils' rotation (roll, pitch, and yaw), and eye blinking, may recognize that the user's concentration level has decreased. When it is recognized that the user's concentration level has decreased, the concentration level check module 1335 may transmit a refresh event notification to the avatar animation module 1350. When the refresh event notification is obtained, the avatar animation module 1350 may stop the first avatar animation currently being reproduced, then reproduce a refresh mode animation capable of arousing the user's attention, and, when the reproduction of the refresh mode animation is completed, reproduce the first avatar animation again from the stopped part.

According to an embodiment of the disclosure, the utterance mode change module 1337 may identify whether to change the utterance mode of the avatar, based on an input of the speaker volume adjuster 1150 while the avatar animation is being reproduced.

When the input of the speaker volume adjuster 1150 is confirmed, the utterance mode change module 1337 may determine whether to change the utterance mode of the avatar animation currently being reproduced. For example, a case is assumed, in which, when the volume level of an electronic device is 0-5, the avatar's utterance mode is set to be determined as <whisper>, when the volume level thereof is 6-12, the avatar's utterance mode is set to be determined as <normal>, and, when the volume level thereof is 13 or higher, the avatar's utterance mode is set to be determined as <presentation>. When a volume down input is identified by the speaker volume adjuster 1150, the utterance mode change module 1337 determines whether there is a need to change the utterance mode of the first avatar animation currently being reproduced. When the volume level of the electronic device 1000 decreases from 6 to 5 due to the volume down input, the utterance mode may be changed from <normal> to <whisper>, and the utterance mode change module 1337 may transmit an utterance ignition mode change event notification and the changed volume level (or the changed utterance mode) to the avatar animation module 1350. When the utterance mode change event notification is obtained, the avatar animation module 1350 may change the avatar animation by using a facial expression corresponding to the changed utterance mode and lip sync data determined based on the changed utterance mode, in the first avatar animation currently being reproduced.

Figure 12:
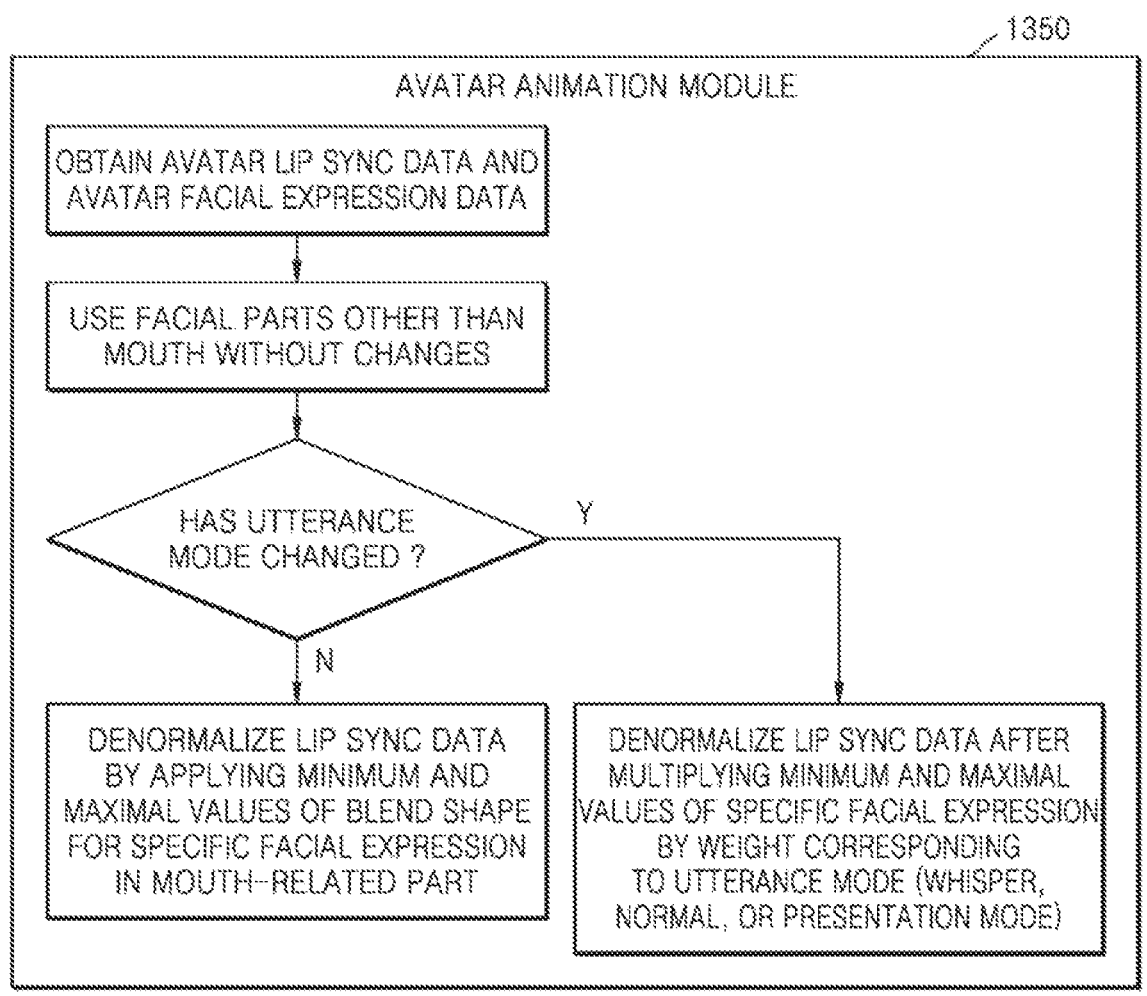
FIG. 12 is a diagram illustrating an avatar animation generation method according to an embodiment.

FIG. 12 is a diagram illustrating an avatar animation generation method according to an embodiment of the disclosure.

Referring to FIG. 12, in the electronic device 1000 according to an embodiment of the disclosure, the avatar animation module 1350 may generate first avatar facial expression data, and may generate second avatar facial expression data based on lip sync data generated based on the first avatar facial expression data.

According to an embodiment of the disclosure, the avatar animation module 1350 may obtain first avatar facial expression data and first avatar lip sync data for a response to the user-uttered voice, use facial expression data of facial parts other than the mouth without changes, and modify facial expression data of a lip part by using lip sync data, thereby implementing a more natural facial expression.

According to an embodiment of the disclosure, because the lip sync data is normalized within an available range as shown in [Equation 4] and then input to and learned by a lip sync model, the lip sync data inferred using the lip sync model needs to be denormalized.

For example, the avatar animation module 1350 may determine whether an utterance mode event is identified, and, when the utterance mode has not changed, may denormalize the obtained lip sync data by using the minimum and maximal values of the blendshape representing a mouth area.

Alternatively, the avatar animation module 1350 may determine whether an utterance mode event is identified, and, when the utterance mode has changed, may denormalize the obtained lip sync data after multiplying the minimum and maximal values of the blendshape representing a mouth area by a weight according to the changed utterance mode.

A method of modifying the facial expression data by using the avatar lip sync data will be described in more detail with reference to FIGS. 13A through 15.

Figure 13A:
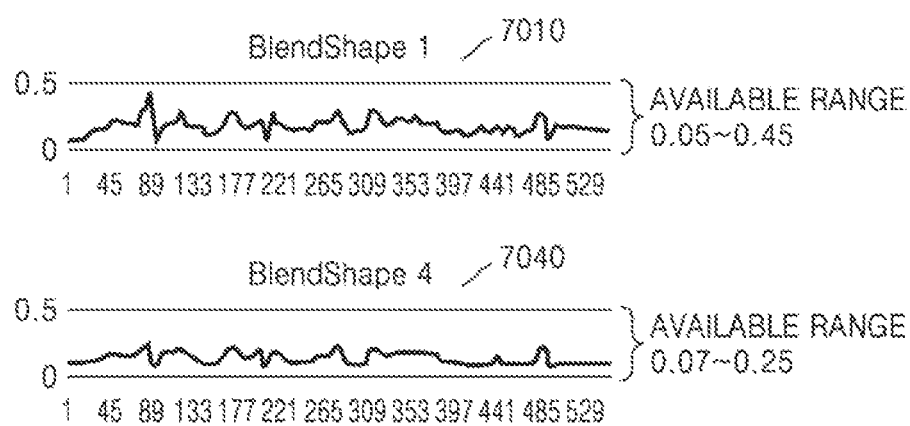
FIGS. 13A and 13B are views illustrating a method of pre-processing facial expression data or lip sync data for training a neural network model from a specific facial expression and post-processing inferred facial expression data or lip sync data, in an interactive avatar providing method according to an embodiment.
Figure 13B:
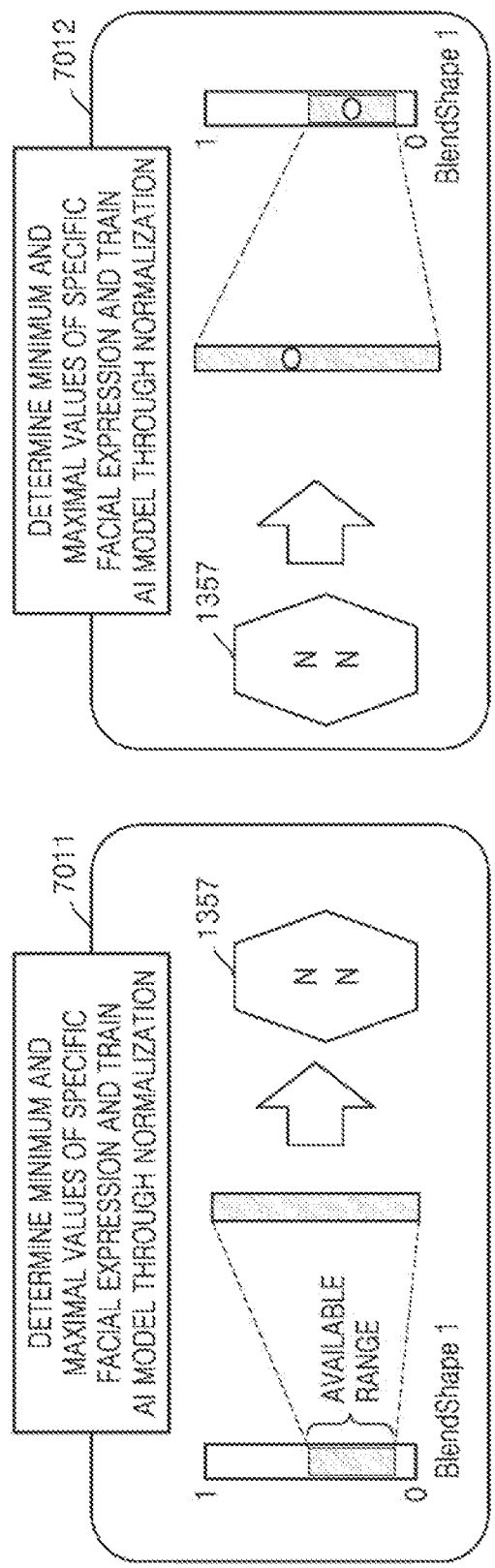

FIGS. 13A and 13B are views illustrating a method of pre-processing facial expression data or lip sync data for training a neural network model from a specific facial expression and post-processing inferred facial expression data or lip sync data, in an interactive avatar providing method according to an embodiment of the disclosure.

The facial expression data according to an embodiment of the disclosure may be a blendshape for expressing a face, and the lip sync data may refer to a blendshape for expressing a mouth and a portion around the mouth among the facial expression data. The blendshape is expressed as a decimal in the range of [0, 1], and is reflected as a coefficient in a mesh expressed as each blend shape.

Referring to FIG. 13A, each blendshape may have different available ranges in a specific facial expression. For example, when blendshapes for each frame over time for implementing a specific facial expression of an avatar are measured, the available range of a first blendshape 7010 may be measured in the range of [min 0.05, max 0.45], and the available range of a fourth blendshape 7040 may be measured as [min 0.07, max 0.25].

In this case, when a neural network model is trained using data in the [0, 1] range regardless of the available range of blendshapes, the learning efficiency of the neural network model may decrease. Therefore, after the available range of each blendshape during learning is measured, the available range is scaled down to [0, 1] through normalization to train the neural network model, and a normalized range of each blendshape is scaled up through de-normalization back to the available range by using the trained neural network model during inferring of a blend shape, thereby improving learning efficiency.

Referring to 7011 of FIG. 13B, the available range of a first blendshape 7010 is [min 0.05, max 0.45], and the first blendshape 7010 may be measured within a range of 0.4. Therefore, when the neural network model is trained through normalization to the [0, 1] range, training is possible only within the blendshape's available range.

Referring to 7012 of FIG. 13B, the first blendshape 7010 inferred using the trained neural network model may be denormalized back to the range [min 0.05, max 0.45], which is the available range of the first blendshape 7010. For example, when a coefficient value BS1_NN of a first blendshape inferred from the neural network model is 0.3, a coefficient value BS1 of a denormalized first blendshape is determined as 0.17 according to [Equation 5].

$$BS1 = \min + BS1_{NN} * (\max - \min) \qquad \text{[Equation 5]}$$

Figure 14A:
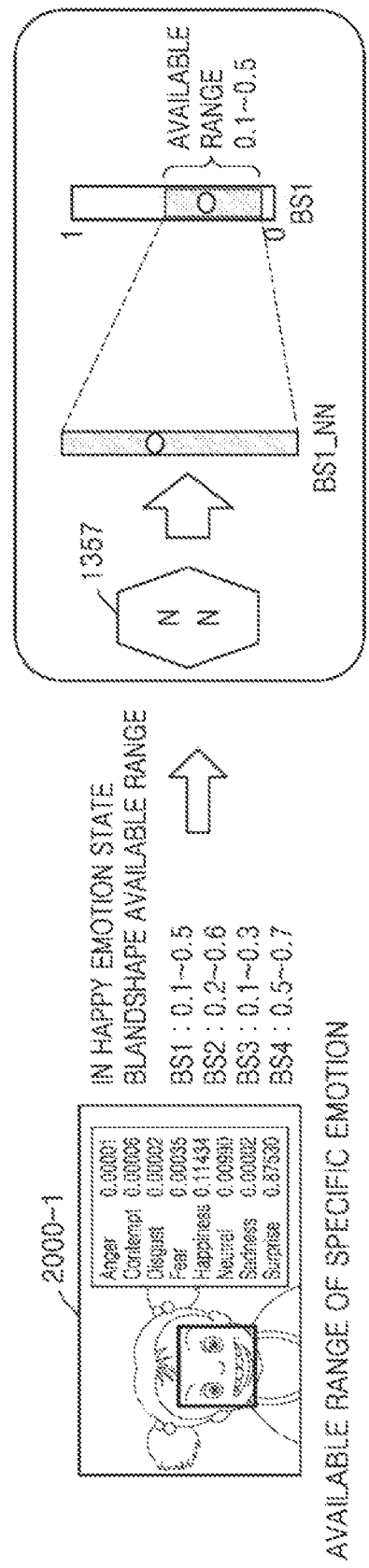
FIGS. 14A and 14B are views illustrating a method of denormalizing lip sync data inferred according to an avatar's facial expression or emotion, in an interactive avatar providing method according to an embodiment.
Figure 14B:
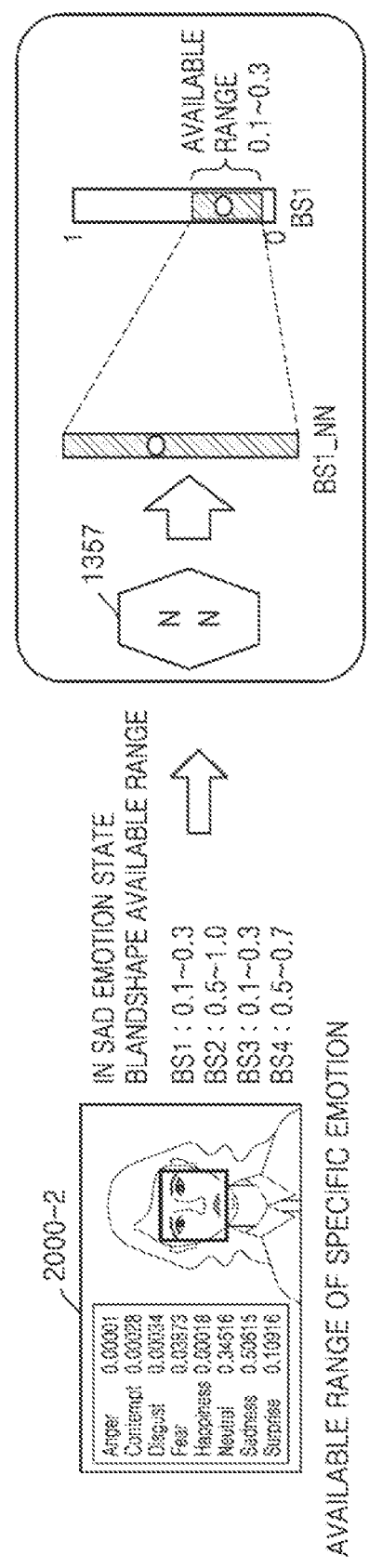

FIGS. 14A and 14B are views illustrating a method of denormalizing lip sync data inferred according to an avatar's facial expression or emotion, in an interactive avatar providing method according to an embodiment of the disclosure.

As described above, the available range of facial expression data (e.g., a blend shape) may vary for each specific facial expression of the avatar, and, likewise, the available range of lip sync data (e.g., a blendshape around the mouth among the entire blend shape) may also vary.

Accordingly, because the facial expression may vary according to an emotional state even when the avatar says the same speech, the denormalization range of the blendshape inferred by a neural network may vary. Therefore, even when the uttered voice information of the avatar is the same, different blend shapes may be determined based on the facial expression of the avatar according to the emotional state.

Because different blend shapes may be determined according to emotional states, namely, facial expressions, even when the avatar utters the same voice, the lip sync model 1357 according to an embodiment of the disclosure may be trained based on a value obtained by normalizing the available range, that is, the minimum value min and the maximum value max, of each blendshape measured according to a facial expression.

[min 0.1, max 0.3], [min 0.5, max 1.0], [min 0.1, max 0.3], and [min 0.5, max 0.7], respectively. Because the available range of the first blendshape BS1 is 0.2 of [min 0.1, max 0.3], the lip sync model 1357 may be trained with data obtained by normalizing the first blendshape BS1 to the range of [0, 1], and the first blendshape BS1 in the [0, 1] range inferred using the lip sync model 1357 may be obtained by denormalizing BS1_NN, which is an output of the lip sync model 1357, to a range of [min 0.1, max 0.3].

As described above, the lip sync model 1357 is trained by normalizing data by using the available range of a blendshape for lip sync data determined based on a specific emotional state of the avatar, and the inferred blendshape is denormalized back to the available range, leading to improvements of learning performance and inference accuracy of the lip sync model 1357.

[Table 1] shows an embodiment of facial expression data when an avatar is in a sad emotional state.

TABLE 1

| Number | Index(name) | NN output value | — | Final value |
|---|---|---|---|---|
| N2 | eyeBlinkLeft | 0.3 | — | 0.3 |
|  | eyeLookDownLeft | 0.3 | — | 0.3 |
|  | eyeLookInLeft | 0.3 | — | 0.3 |
|  | eyeLookOutLeft | 0.5 | — | 0.5 |
|  | eyeLookUpLeft | 0.2 | — | 0.2 |
|  | . | . | . | . |
|  | . | . | . | . |
|  | . | . | . | . |

| Number | Index(name) | NN output value | In a sad emotion Available range | Final value |
|---|---|---|---|---|
| N1 | jawLeft | 0.1 | 0.3 to 0.7 | 0.34 |
|  | jawRight | 0.2 | 0.3 to 0.7 | 0.38 |
|  | mouthClose | 0.9 | 0.3 to 0.7 | 0.66 |
|  | . | . | . | . |
|  | . | . | . | . |
|  | . | . | . | . |

In FIG. 14A, it is assumed that a first avatar 2000-1 is in a happy emotional state and lip sync data used for the first avatar 2000-1 to utter a voice 'hello' is first through fourth blend shapes BS1 through BS4.

Referring to FIG. 14A, the first, second, third, and fourth blend shapes BS1, BS2, BS3, and BS4, which are the lip sync data of the first avatar 2000-1 used to utter a voice 'hello' in a happy emotion state, may have available ranges of [min 0.1, max 0.5], [min 0.2, max 0.6], [min 0.1, max 0.3], and [min 0.5, max 0.7], respectively. Because the available range of the first blendshape BS1 is 0.4 of [min 0.1, max 0.5], the lip sync model 1357 may be trained with data obtained by normalizing the first blendshape BS1 to the range of [0, 1], and the first blendshape BS1 in the [0, 1] range inferred using the lip sync model 1357 may be obtained by denormalizing BS1_NN, which is an output of the lip sync model 1357, to a range of [min 0.1, max 0.5].

In FIG. 14B, it is assumed that a second avatar 2000-2 is in a sad emotional state and lip sync data used for the second avatar 2000-2 to utter a voice 'hello' is first through fourth blend shapes BS1 through BS4.

Referring to FIG. 14B, the first, second, third, and fourth blend shapes BS1, BS2, BS3, and BS4, which are the lip sync data of the second avatar 2000-2 used to utter a voice 'hello' in a sad emotion state, may have available ranges of According to an embodiment of the disclosure, the facial expression data is N (N1+N2) blend shapes, and may include N2 blend shapes related to the eyes, nose, cheeks, etc., and lip sync data, which is N1 blend shapes related to the shape of the mouth.

The blend shapes may be obtained from an output obtained by inputting the uttered voice of the avatar to the neural network model. Among them, the N2 blend shapes related to the eyes, nose, cheeks, etc. may create an avatar animation by using the neural network output without changes.

As described above, the avatar's lip sync according to emotions and situations has a great influence on a user's liking for the avatar, so, when the avatar's mouth is expressed more elaborately and accurately, the user may feel a liking for the avatar and have more satisfaction in interactions with the avatar. Accordingly, in the interactive avatar providing method according to an embodiment of the disclosure, more accurate lip sync data may be obtained by pre-processing the input data of the lip sync model and post-processing the output of the lip sync model.

Referring to [Table 1], the lip sync data may be N1 blendshapes including {jawLeft, jawRight, mouthClose, . . . }, and, when outputs of the neural network model (lip sync model) are 0.1, 0.2, and 0.3 and an available range when the avatar is sad is [0.3, 0.7], a final value of {jawLeft, jawRight, mouthClose, . . . } may be determined as {0.34, 0.38, 0.66, . . . } by using [Equation 5].

Figure 15:
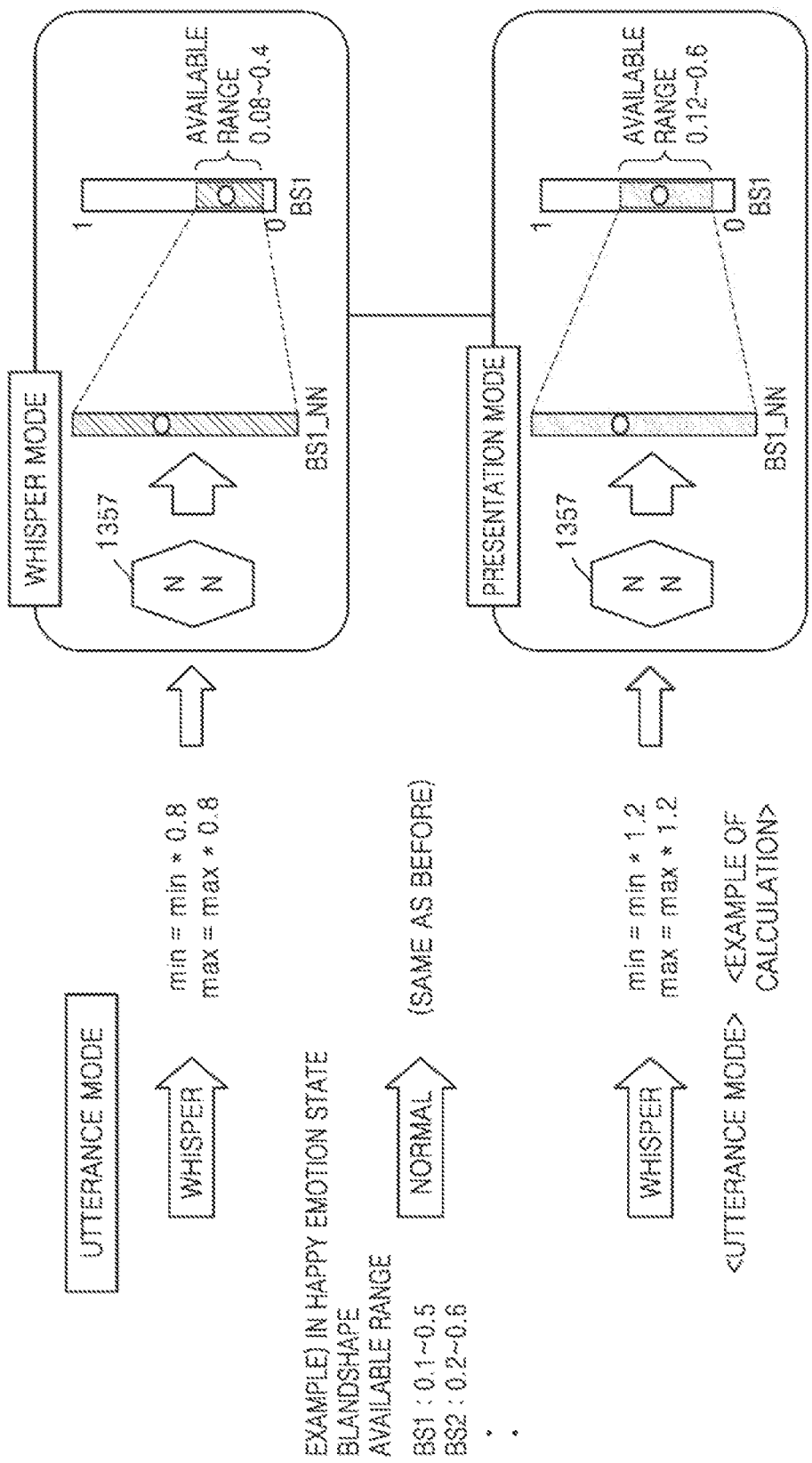
FIG. 15 is a view illustrating a method of determining a weight for the available range of lip sync data, based on an utterance mode, in an interactive avatar providing method according to an embodiment.

FIG. 15 is a view illustrating a method of determining a weight for the available range of lip sync data, based on an utterance mode, in an interactive avatar providing method according to an embodiment of the disclosure.

In the interactive avatar providing method according to an embodiment of the disclosure, the electronic device 1000 may change the available range of blendshapes corresponding to the lip sync data, based on the utterance mode of the avatar.

In more detail, in an utterance mode in which the avatar speaks in a strong tone, the electronic device 1000 according to an embodiment of the disclosure may determine a blendshape corresponding to the lip sync data has a larger value. On the other hand, in an utterance mode in which the avatar speaks in a soft tone, the electronic device 1000 according to an embodiment of the disclosure may determine a blendshape corresponding to the lip sync data has a smaller value.

Referring to FIG. 15, it is assumed that the avatar's utterance mode may be determined as one of a 'whisper' mode, a 'normal' mode, and a 'presentation' mode, and the available ranges of blendshapes BS1 and BS2 corresponding to lip sync data in a specific emotional state are [min 0.1, max 0.5] and [min 0.2, max 0.6], respectively.

When the utterance mode of the avatar is the 'normal' mode, the electronic device 1000 uses the available range of the blendshape without changes. When the utterance mode of the avatar is the 'presentation' mode, the electronic device 1000 may multiply the available ranges of BS1 and BS2 by a weight greater than 1 (e.g., w=1.2) in order to enable the blendshape to have a larger value than the 'normal' mode. As a result, the available range of the blendshape BS1 to which the weight according to the 'presentation' mode has been applied may be determined as [min 0.12, max 0.6], and the available range of BS2 to which the weight according to the 'presentation' mode has been applied may be determined as [min 0.24, max 0.72].

When the utterance mode of the avatar is the 'whisper' mode, the electronic device 1000 may multiply the available ranges of BS1 and BS2 by a weight less than 1 (e.g., w=0.8) in order to enable the blendshape to have a smaller value than the 'normal' mode. As a result, the available range of the blendshape BS1 to which the weight according to the 'whisper' mode has been applied may be determined as [min 0.08, max 0.4], and the available range of BS2 to which the weight according to the 'whisper' mode has been applied may be determined as [min 0.16, max 0.48].

Being created through learning means that a basic AI model is learned using a plurality of learning data by a learning algorithm, so that a predefined operation rule or AI model set to perform desired characteristics (or a purpose) is created. The AI model may be composed of a plurality of neural network layers. Each of the plurality of neural network layers has a plurality of weight values, and performs a neural network operation through an operation between an operation result of a previous layer and the plurality of weight values.

Inference prediction is a technology for logically reasoning and predicting information by judging information. Examples of the inference prediction include knowledge based Reasoning, optimization prediction, preference-based planning, and recommendation.

While the disclosure has been particularly shown and described with reference to exemplary embodiments thereof, it will be understood that various changes in form and details may be made therein without departing from the spirit and scope of the disclosure. Thus, the above-described embodiments should be considered in descriptive sense only and not for purposes of limitation. For example, each component described as a single type may be implemented in a distributed manner, and similarly, components described as being distributed may be implemented in a combined form.

The machine-readable storage medium may be provided as a non-transitory storage medium. The 'non-transitory storage medium' is a tangible device and only means that it does not contain a signal (e.g., electromagnetic waves). This term does not distinguish a case in which data is stored semi-permanently in a storage medium from a case in which data is temporarily stored. For example, the non-transitory recording medium may include a buffer in which data is temporarily stored.

According to an embodiment of the disclosure, a method according to various disclosed embodiments may be provided by being included in a computer program product. The computer program product, which is a commodity, may be traded between sellers and buyers. Computer program products are distributed in the form of device-readable storage media (e.g., compact disc read only memory (CD-ROM)), or may be distributed (e.g., downloaded or uploaded) through an application store or between two user devices (e.g., smartphones) directly and online. In the case of online distribution, at least a portion of the computer program product (e.g., a downloadable app) may be stored at least temporarily in a device-readable storage medium, such as a memory of a manufacturer's server, a server of an application store, or a relay server, or may be temporarily generated.

What is claimed is:

1. A method, performed by an electronic device, of providing an avatar service, comprising:
   obtaining a user-uttered voice and a spatial information of a user-utterance space where a user utters the user-uttered voice, the spatial information comprising spatial characteristics of the user-utterance space based on at least one of images captured by a camera and a sound obtained through a microphone, wherein the spatial information comprises at least one of: whether the user-utterance space is public or private; or whether the user-utterance space is quiet or noisy;
   transmitting the user-uttered voice and the spatial information to a server;
   receiving, from the server, a first avatar voice answer and an avatar facial expression sequence corresponding to the first avatar voice answer, which are determined based on the user-uttered voice and an avatar response mode, wherein the avatar response mode is determined based on the spatial information;
   determining first avatar facial expression data, based on the first avatar voice answer and the avatar facial expression sequence;
   identifying a certain event during reproduction of a first avatar animation created based on the first avatar voice answer and the first avatar facial expression data;
   determining second avatar facial expression data or a second avatar voice answer, based on the certain event; and
   stopping reproduction of the first avatar animation, and reproducing a second avatar animation created based on the second avatar facial expression data or the second avatar voice answer.

2. The method of claim 1, wherein the spatial information comprises information about whether the user-utterance space is a public place and a level of noise in the user-utterance space.

3. The method of claim 1, wherein the first avatar facial expression data and the second avatar facial expression data each comprise a set of coefficients for each of a plurality of reference three-dimensional (3D) meshes for modeling a facial expression of the first avatar animation and the second avatar animation, respectively.

4. The method of claim 1, wherein:
the second avatar facial expression data comprises lip sync data, and
the lip sync data is obtained using an artificial intelligence (AI) model.

5. The method of claim 4, wherein the AI model is trained using data normalized based on an available range according to the lip sync data.

6. The method of claim 1, wherein the certain event comprises at least one of an utterance mode change event, an observation mode event, or a refresh mode event.

7. The method of claim 6, wherein, based on the certain event being the refresh mode event, the stopping reproduction of the first avatar animation, and the reproducing of the second avatar animation comprises:
stopping the reproduction of the first avatar animation at a point in time;
reproducing a preset refresh animation; and
reproducing the first avatar animation from the point in time at which the first avatar animation is stopped.

8. The method of claim 6, wherein, based on the certain event being the utterance mode change event, the determining of the second avatar facial expression data or the second avatar voice answer comprises:
determining the second avatar facial expression data by modifying the first avatar facial expression data, based on an utterance mode obtained as a result of the certain event; and
modifying the first avatar voice answer, based on the utterance mode.

9. The method of claim 6, wherein, based on the certain event being the observation mode event, the determining of the second avatar facial expression data or the second avatar voice answer comprises determining the second avatar facial expression data by changing a face direction or eye direction of the first avatar animation.

10. A method, performed by a server, of providing an avatar service through an electronic device, the method comprising:
receiving, from the electronic device, a user-uttered voice and spatial information of a user-utterance space where a user utters the user-uttered voice, the spatial information comprising spatial characteristics of the user-utterance space based on at least one of images captured by a camera and a sound obtained through a microphone, wherein the spatial information comprises at least one of: whether the user-utterance space is public or private; or whether the user-utterance space is quiet or noisy;
determining an avatar response mode for the user-uttered voice, based on the spatial information;
generating a first avatar voice answer for an avatar to respond to the user-uttered voice and an avatar facial expression sequence corresponding to the first avatar voice answer, based on the user-uttered voice and the avatar response mode; and
transmitting the first avatar voice answer and the avatar facial expression sequence for generating a first avatar animation to the electronic device.

11. An electronic device for providing an avatar service, comprising:
a communication interface;
a storage storing at least one instruction; and
at least one processor configured to execute the at least one instruction stored in the storage, wherein the at least one processor is configured to execute the at least one instruction to:
obtain a user-uttered voice and a spatial information of a user-utterance space where a user utters the user-uttered voice, the spatial information comprising spatial characteristics of the user-utterance space based on at least one of images captured by a camera and a sound obtained through a microphone, wherein the spatial information comprises at least one of: whether the user-utterance space is public or private; or whether the user-utterance space is quiet or noisy;
transmit the user-uttered voice and the spatial information to a server;
receive, from the server through the communication interface, a first avatar voice answer and an avatar facial expression sequence corresponding to the first avatar voice answer, which are determined based on the user-uttered voice and an avatar response mode, wherein the avatar response mode is determined based on the spatial information;
determine first avatar facial expression data, based on the first avatar voice answer and the avatar facial expression sequence;
identify a certain event during reproduction of a first avatar animation created based on the first avatar voice answer and the first avatar facial expression data;
determine second avatar facial expression data or a second avatar voice answer, based on the certain event; and
reproduce a second avatar animation created based on the second avatar facial expression data or the second avatar voice answer.

12. The electronic device of claim 11, wherein the spatial information comprises information about whether the user-utterance space is a public place and a level of noise in the user-utterance space.

13. The electronic device of claim 11, wherein the first avatar facial expression data and the second avatar facial expression data each comprise a set of coefficients for each of a plurality of reference three-dimensional (3D) meshes for modeling a facial expression of the first avatar animation and the second avatar animation, respectively.

14. The electronic device of claim 11, wherein:
the second avatar facial expression data comprises lip sync data, and
the lip sync data is obtained using an artificial intelligence (AI) model.

15. The electronic device of claim 14, wherein the AI model is trained using data normalized based on an available range according to the lip sync data.

16. The electronic device of claim 11, wherein the certain event comprises at least one of an utterance mode change event, an observation mode event, or a refresh mode event.

17. The electronic device of claim 16, wherein, when based on the certain event being the refresh mode event, the second avatar animation is a preset refresh animation.

18. A non-transitory computer-readable recording medium for storing computer readable program code or instructions which are executable by a processor to perform a method of providing an avatar service, the method comprising:

obtaining a user-uttered voice and a spatial information of a user-utterance space where a user utters the user-uttered voice, the spatial information comprising spatial characteristics of the user-utterance space based on at least one of images captured by a camera and a sound obtained through a microphone, wherein the spatial information comprises at least one of: whether the user-utterance space is public or private; or whether the user-utterance space is quiet or noisy;

transmitting the user-uttered voice and the spatial information to a server;

receiving, from the server, a first avatar voice answer and an avatar facial expression sequence corresponding to the first avatar voice answer, which are determined based on the user-uttered voice and an avatar response mode, wherein the avatar response mode is determined based on the spatial information;

determining first avatar facial expression data, based on the first avatar voice answer and the avatar facial expression sequence;

identifying a certain event during reproduction of a first avatar animation created based on the first avatar voice answer and the first avatar facial expression data;

determining second avatar facial expression data or a second avatar voice answer, based on the certain event; and stopping reproduction of the first avatar animation, and reproducing a second avatar animation created based on the second avatar facial expression data or the second avatar voice answer.

* * * * *